United States Patent
Nicholas et al.

(10) Patent No.: US 11,724,325 B2
(45) Date of Patent: Aug. 15, 2023

(54) BRAZING METHODS USING POROUS INTERLAYERS AND RELATED ARTICLES

(71) Applicants: BOARD OF TRUSTEES OF MICHIGAN STATE UNIVERSITY, East Lansing, MI (US); DELPHI TECHNOLOGIES, LLC, Troy, MI (US)

(72) Inventors: Jason Dale Nicholas, Okemos, MI (US); Quan Zhou, Farmington Hills, MI (US); Thomas Rector Bieler, East Lansing, MI (US); Rick Daniel Kerr, Fenton, MI (US)

(73) Assignees: BOARD OF TRUSTEES OF MICHIGAN STATE UNIVERSITY, East Lansing, MI (US); DELPHI TECHNOLOGIES, LLC, Troy, MI (US)

(*) Notice: Subject to any disclaimer, the term of this patent is extended or adjusted under 35 U.S.C. 154(b) by 30 days.

(21) Appl. No.: 17/518,734

(22) Filed: Nov. 4, 2021

(65) Prior Publication Data

US 2022/0055133 A1 Feb. 24, 2022

Related U.S. Application Data

(62) Division of application No. 15/975,318, filed on May 9, 2018, now Pat. No. 11,167,363.

(Continued)

(51) Int. Cl.
B23K 20/00 (2006.01)
B23K 1/00 (2006.01)
(Continued)

(52) U.S. Cl.
CPC ............ B23K 1/0016 (2013.01); B23K 1/008 (2013.01); B23K 1/19 (2013.01); B23K 1/20 (2013.01);
(Continued)

(58) Field of Classification Search
CPC ........ B23K 1/0016; B23K 1/008; B23K 1/19; B23K 1/20; B23K 2101/36;
(Continued)

(56) References Cited

U.S. PATENT DOCUMENTS 2,694,852 A 11/1954 Rogers
3,006,069 A 10/1961 Rhoads et al.
(Continued)

FOREIGN PATENT DOCUMENTS

CN 101395731 B * 8/2010 ................ B22F 7/08
CN 104185900 A * 12/2014 ........... B23K 1/0012
(Continued)

OTHER PUBLICATIONS

Schupbach et al., "SIC technology will meet the military's future needs, RF Design", pp. 8-13 (Feb. 2007).
(Continued)

*Primary Examiner* — Kiley S Stoner
(74) *Attorney, Agent, or Firm* — Marshall, Gerstein & Borun LLP

(57) ABSTRACT

The disclosure relates to a brazing method for joining substrates, in particular where one of the substrates is difficult to wet with molten braze material. The method includes formation of a porous metal layer on a first substrate to assist wetting of the first substrate with a molten braze metal, which in turn permits joining of the first substrate with a second substrate via a braze metal later in an assembled brazed joint. Ceramic substrates can be particularly difficult to wet with molten braze metals, and the (Continued)

disclosed method can be used to join a ceramic substrate to another substrate. The brazed joint can be incorporated into a solid-oxide fuel cell, for example as a stack component thereof, in particular when the first substrate is a ceramic substrate and the joined substrate is a metallic substrate.

20 Claims, 9 Drawing Sheets

Related U.S. Application Data

(60) Provisional application No. 62/504,210, filed on May 10, 2017.

(51) Int. Cl.
| | |
|---|---|
| H01M 8/1246 | (2016.01) |
| H01M 8/0245 | (2016.01) |
| H01M 8/0236 | (2016.01) |
| B23K 1/19 | (2006.01) |
| H01M 8/0232 | (2016.01) |
| B23K 1/008 | (2006.01) |
| B23K 1/20 | (2006.01) |
| H01M 8/0282 | (2016.01) |
| B23K 20/02 | (2006.01) |
| B23K 101/36 | (2006.01) |
| H01M 8/12 | (2016.01) |
| B23K 101/42 | (2006.01) |

(52) U.S. Cl.
CPC ............ B23K 20/00 (2013.01); B23K 20/026 (2013.01); H01M 8/0232 (2013.01); H01M 8/0236 (2013.01); H01M 8/0245 (2013.01); H01M 8/0282 (2013.01); H01M 8/1246 (2013.01); *B23K 2101/36* (2018.08); *B23K 2101/42* (2018.08); *H01M 2008/1293* (2013.01)

(58) Field of Classification Search
CPC ......... B23K 2101/42; B23K 20/00–04; H01M 8/0232; H01M 8/0236; H01M 8/0245; H01M 8/0282; H01M 8/1246; H01M 2008/1293; Y02E 60/50
USPC ........... 228/245–262, 193–195, 122.1–124.7
See application file for complete search history.

(56) References Cited

U.S. PATENT DOCUMENTS

| | | | | |
|---|---|---|---|---|
| 3,029,559 | A | | 4/1962 | Treptow |
| 3,386,159 | A | | 6/1968 | Milch et al. |
| 3,501,013 | A | | 3/1970 | Madsen |
| 3,704,872 | A | | 12/1972 | Klein |
| 3,795,041 | A | * | 3/1974 | Hennicke ............ C04B 35/645 |
| | | | | 228/124.6 |
| 4,065,851 | A | | 1/1978 | Kummer et al. |
| 4,582,240 | A | * | 4/1986 | Lux ...................... H10N 30/057 |
| | | | | 228/262.21 |
| 4,624,404 | A | * | 11/1986 | Ohmae ............... C04B 35/6455 |
| | | | | 228/198 |
| 4,650,107 | A | | 3/1987 | Keser |
| 4,729,504 | A | * | 3/1988 | Edamura ............. C04B 37/026 |
| | | | | 228/248.1 |
| 4,763,828 | A | * | 8/1988 | Fukaya ................ C04B 37/026 |
| | | | | 228/124.1 |
| 4,875,616 | A | | 10/1989 | Nixdorf |
| 5,043,229 | A | | 8/1991 | Mizuhara |
| 5,139,191 | A | | 8/1992 | Velterop |
| 5,161,728 | A | * | 11/1992 | Li ............................ B22F 1/18 |
| | | | | 228/124.1 |
| 5,289,967 | A | * | 3/1994 | Bampton ............. B23K 35/327 |
| | | | | 228/195 |
| 5,495,978 | A | | 3/1996 | Muth |
| 5,794,838 | A | | 8/1998 | Ushikoshi et al. |
| 6,280,584 | B1 | | 8/2001 | Kumar et al. |
| 6,521,350 | B2 | * | 2/2003 | Fey .................... B23K 35/3033 |
| | | | | 428/629 |
| 8,220,695 | B1 | * | 7/2012 | Wei ......................... B23K 1/008 |
| | | | | 228/221 |
| 8,563,142 | B2 | * | 10/2013 | Bossmann ........... B23K 35/0238 |
| | | | | 427/191 |
| 9,623,504 | B2 | | 4/2017 | Park et al. |
| 2003/0102356 | A1 | | 6/2003 | Schwarzbauer |
| 2003/0141345 | A1 | * | 7/2003 | Shinkai .................... B23K 1/20 |
| | | | | 228/122.1 |
| 2003/0234280 | A1 | * | 12/2003 | Cadden .............. B23K 35/0233 |
| | | | | 228/246 |
| 2005/0103825 | A1 | * | 5/2005 | Jiang ..................... C04B 35/645 |
| | | | | 228/122.1 |
| 2008/0131723 | A1 | | 6/2008 | Tucker et al. |
| 2009/0169726 | A1 | | 7/2009 | Fujii et al. |
| 2010/0300767 | A1 | | 12/2010 | Cariveau et al. |
| 2011/0244264 | A1 | | 10/2011 | Anton et al. |
| 2012/0018493 | A1 | | 1/2012 | Baffle et al. |
| 2012/0160084 | A1 | * | 6/2012 | Mosser ................. B23K 20/023 |
| | | | | 89/917 |
| 2012/0164510 | A1 | * | 6/2012 | Weaver ................ B23K 20/023 |
| | | | | 429/142 |
| 2012/0305281 | A1 | * | 12/2012 | Knoll .................... C04B 37/021 |
| | | | | 228/122.1 |
| 2013/0000718 | A1 | | 1/2013 | Tsao |
| 2013/0064602 | A1 | | 3/2013 | Chaumat et al. |
| 2013/0134591 | A1 | | 5/2013 | Sakamoto et al. |
| 2013/0193194 | A1 | | 8/2013 | Yang et al. |
| 2013/0248777 | A1 | | 9/2013 | Sgriccia et al. |
| 2013/0328204 | A1 | | 12/2013 | Zommer |
| 2014/0252578 | A1 | | 9/2014 | Berlin et al. |
| 2014/0305481 | A1 | | 10/2014 | Brandenburg et al. |
| 2015/0097321 | A1 | | 4/2015 | Kasonde et al. |
| 2015/0360311 | A1 | * | 12/2015 | Zheng ....................... C22C 29/14 |
| | | | | 228/122.1 |
| 2016/0046531 | A1 | * | 2/2016 | Izumi .................... C04B 37/025 |
| | | | | 428/116 |
| 2017/0368646 | A1 | | 12/2017 | Ryon et al. |
| 2018/0169796 | A1 | | 6/2018 | Clark et al. |

FOREIGN PATENT DOCUMENTS

| | | | | | |
|---|---|---|---|---|---|
| CN | 105346161 | A | * | 2/2016 | |
| CN | 104874909 | B | * | 1/2017 | ............. B23K 20/02 |
| DE | 102008006039 | A1 | * | 7/2009 | ............. C23C 10/02 |
| EP | 146493 | A | * | 6/1985 | ......... C04B 35/6455 |
| EP | 2450471 | A1 | | 5/2012 | |
| JP | H0936540 | A | * | 2/1997 | |
| JP | 2004186116 | A | * | 7/2004 | |
| JP | 2016082234 | A | * | 5/2016 | ............. B23K 20/02 |
| KR | 100420243 | B1 | * | 3/2004 | |
| KR | 20090032037 | A | * | 3/2009 | |
| KR | 20150012546 | A | * | 2/2015 | |
| WO | WO-2004032258 | A2 | * | 4/2004 | ........... H01M 8/0239 |
| WO | WO-2011031623 | A1 | * | 3/2011 | ............. B23K 20/021 |
| WO | WO-2012/018046 | A1 | | 2/2012 | |
| WO | WO-2012042907 | A1 | * | 4/2012 | ............. B23K 20/02 |
| WO | WO-2014033283 | A1 | * | 3/2014 | ........... H01M 8/0247 |
| WO | WO-2014115677 | A1 | * | 7/2014 | ............. B23K 20/02 |
| WO | WO-2015163452 | A1 | * | 10/2015 | ............. B23K 20/02 |
| WO | WO-2017038855 | A1 | * | 3/2017 | ............. B22F 7/062 |
| WO | WO-2017051798 | A1 | * | 3/2017 | ............... B23K 1/00 |

OTHER PUBLICATIONS

Schüler et al., "Direct silver bonding—an alternative for substrates in power semiconductor packaging", *J. Materials Sci: Materials in Electronics*, 11:389-96 (2000).
Zhou et al., "Reactive-Element-Free, Silver-Based Brazes for SOFC Applications", U.S. Department of Energy, Michigan State University (publicly available before May 11, 2017).

(56) References Cited

OTHER PUBLICATIONS

Zhou et al., "Transient porous nickel interlayers for improved silver-based solid oxide fuel cell brazes", *Acta Materialia*, 148:156-62 (2018).

* cited by examiner (To be continued)

(Continuation)

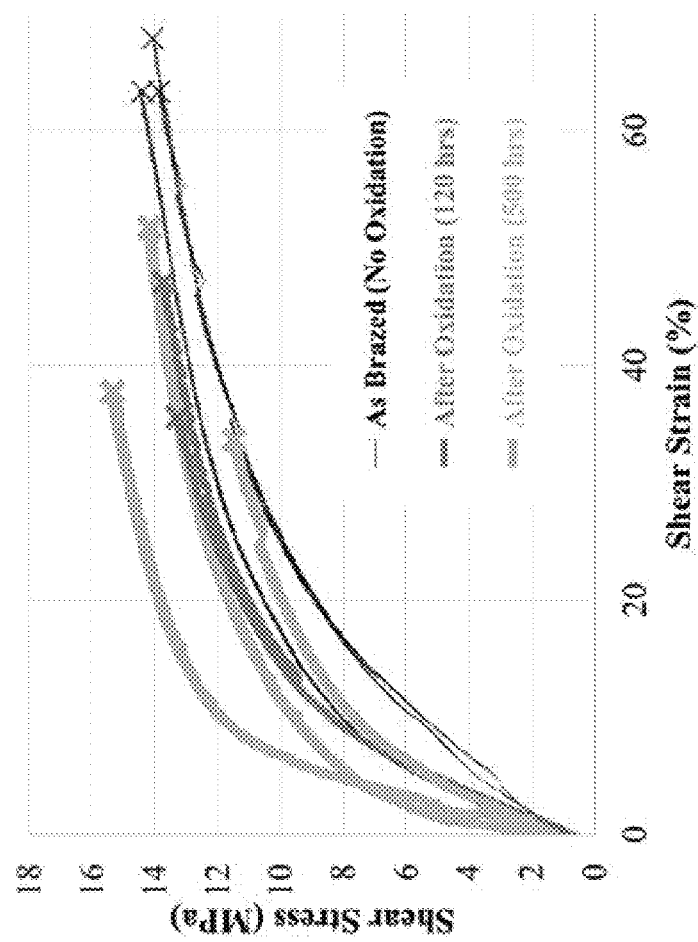

BRAZING METHODS USING POROUS INTERLAYERS AND RELATED ARTICLES

CROSS-REFERENCE TO RELATED APPLICATIONS

This application is a division of U.S. patent application Ser. No. 15/975,318 (filed May 9, 2018), which claims the priority benefit of U.S. Provisional Patent Application No. 62/504,210, filed May 10, 2017, the entire disclosures of which are incorporated herein by reference.

STATEMENT OF GOVERNMENT INTEREST

This invention was made with government support under DE-FE0023315 awarded by the U.S. Department of Energy. The government has certain rights in the invention.

BACKGROUND OF THE DISCLOSURE

Field of the Disclosure

The disclosure relates to a brazing method for joining substrates, in particular where one of the substrates is difficult to wet with molten braze material. The method includes formation of a porous metal layer on a first substrate to assist wetting of the first substrate with a molten braze metal, which in turn permits joining of the first substrate with a second substrate via a braze metal later in an assembled brazed joint. The brazed joint can be incorporated into a solid-oxide fuel cell, for example as a stack component thereof.

Background

Silver brazes have problems wetting many ceramics and some metals, which is a particular concern when using a brazing technique to join components of solid oxide fuel cell (SOFC) structures.

Reactive air brazing is a type of brazing where minor element additions are made to improve the wetting behavior of a parent (typically inert) braze alloy on ceramic materials. These minor alloy additions improve wetting by migrating to the surface and oxidize during brazing, and hence are compatible with brazing in air. Unfortunately, the wetting angles achieved with reactive air brazing are often many tens of degrees, causing braze joint pores during manufacturing (termed Type I pores). Further, for CuO, the oxides of these minor alloy additions (e.g., in the case of the Ag—Cu brazes used to bond stainless steel to yttria stabilized zirconia for Solid Oxide Fuel Cell and other applications) are easily reduced by hydrogen. The volume reduction caused by the decomposition of these oxides into their base metals introduces pores at the braze interfaces (termed Type II pores), mechanically weakening the braze joint.

Vacuum brazing is an alternative to reactive air brazing. Unfortunately the low oxygen partial pressures encountered with this technique decompose many Solid Oxide Fuel Cell materials.

The addition of reducing agents to the braze compound ($TiH_2$, flux, etc.) can be used to improve braze wetting by locally reducing the oxygen partial pressures ($pO_2$) around the braze. However, these materials often react in a deleterious manner with many Solid Oxide Fuel Cell materials.

SUMMARY

The disclosure relates to a brazing method for joining substrates, in particular where one of the substrates is difficult to wet with molten braze material. The method includes formation of a porous metal layer on a first substrate to assist wetting of the first substrate with a molten braze metal, which in turn permits joining of the first substrate with a second substrate via a braze metal later in an assembled brazed joint. Ceramic substrates can be particularly difficult to wet with molten braze metals, and the disclosed method can be used to join a ceramic substrate (e.g., as the first substrate) to another substrate (e.g., metal substrate, another ceramic substrate, other otherwise as the second substrate). The brazed joint can be incorporated into a solid-oxide fuel cell, for example as a stack component thereof, in particular when the first substrate is a ceramic substrate and the joined second substrate is a metallic substrate.

In a particular embodiment illustrated below, a ceramic substrate suitable for use in a solid-oxide fuel cell is joined to a stainless steel substrate using a silver braze metal and a porous nickel layer to assist wetting of the ceramic substrate. Here, porous nickel layers are pre-sintered onto at least one side of the braze joint (typically the side having problems wetting), and then silver brazing is completed in an atmosphere below the Ni—NiO equilibrium (typically in an inert atmosphere such as argon). This atmosphere is low enough in oxygen partial pressure ($pO_2$) to ensure that no NiO forms on the Ni surface, but not so low that it causes harm to the SOFC cathode, electrolyte, or anode materials. Because of the low wetting angle of silver on nickel in these atmospheres, and the capillary pressure which wicks the silver braze into the porous nickel network, the wetting of nickel is promoted (and the occurrence of Type I pores is greatly lowered). Further, because no NiO is formed during manufacturing, Type II pores are eliminated.

In one aspect, the disclosure relates to a brazing method for joining substrates, the method comprising: (a) providing a porous wetting substrate comprising: (i) an underlying substrate, and (ii) a porous first metal layer on a surface of the underlying substrate; (b) applying (or contacting) a braze second metal material to the porous wetting substrate and in contact with the porous first metal layer thereon, the second metal having a lower melting point than that of the first metal; (c) applying (or contacting) a second substrate to the braze second metal material (e.g., at a surface or side of the braze second metal material not in contact with the porous wetting substrate/porous first metal layer), thereby forming a pre-braze joint comprising the porous wetting substrate, the braze second metal material, and the second substrate (e.g., generally as layers in that order); and (d) brazing the pre-braze joint (e.g., in a protective brazing atmosphere) at a temperature and pressure sufficient to melt the braze second metal material, wet pores of the porous first metal layer with the molten braze second metal material, and contact the first substrate with the molten braze second metal material, thereby forming a brazed joint comprising the first substrate, the second substrate, and a second metal layer joining the first and second substrates. In part (a), the porous first metal layer is suitably adhered to the underlying substrate, such as resulting from a pre-sintering process or otherwise. Suitably, the second metal melting point is at least 20, 25, 50, 100, 200, or 300° C. and/or up to 300, 500, 700, 1000, or 2000° C. lower than the first metal melting point. Similarly, the second metal melting point is suitably lower than the melting or thermal decomposition points of the first and second substrates. In part (d), the brazing temperature is suitably sufficiently high to melt the braze second metal material, but far enough below the melting point of the first metal such that the porous first metal layer does not melt or otherwise disintegrate before its porous structure promotes the wetting and contact of the first substrate with the molten second metal braze. The solid brazed joint forms after cooling from elevated brazing temperature and/or removal of pressure (e.g., in embodiments performed at elevated brazing temperatures but at ambient or non-elevated pressures). The second metal layer generally can include at least one or two portions: a bulk second metal layer and optionally a diffusion layer between the bulk second metal layer and the second substrate.

In another aspect, the disclosure relates to a method of assembling a solid-oxide fuel cell, the method comprising: (a) performing the brazing method in any of the various embodiments for joining substrates to form the brazed joint, wherein the first substrate comprises a ceramic material (e.g., ceramic electrolyte such as YSZ or otherwise), and the second substrate comprises a metal material (e.g., stainless steel or otherwise); and (b) incorporating the brazed joint into a solid-oxide fuel cell as a stack component thereof.

In another aspect, the disclosure relates to a brazed joint comprising: (a) a first substrate; (b) a bulk second metal layer adjacent to the first substrate, the bulk second metal layer comprising a first metal and the second metal, the first metal being at a lower concentration than the second metal in the bulk second metal layer; (c) (optionally) a diffusion layer adjacent to the bulk second metal layer, the diffusion layer comprising the first metal and at least one component (e.g., a metallic element component) of a second substrate adjacent to the diffusion layer; and (d) a second substrate adjacent to the diffusion layer (when present) or the bulk second metal layer (when the diffusion layer is absent). The components of the brazed joint are held fixedly together by the second metal braze joint including the bulk second metal layer and the diffusion layer, when present. In some embodiments, the brazed joint comprises a discrete, porous first metal layer within the bulk second metal layer and adjacent to the first substrate, such as where the porous first metal layer formed during the brazing method is not transient and/or does not disintegrate, remaining in the final brazed joint.

In another aspect, the disclosure relates to a method of assembling a solid-oxide fuel cell, the method comprising: (a) providing the brazed joint according to any of its variously disclosed embodiments, wherein the first substrate comprises a ceramic material (e.g., ceramic electrolyte such as YSZ or otherwise), and the second substrate comprises a metal material (e.g., stainless steel or otherwise); and (b) incorporating the brazed joint into a solid-oxide fuel cell as a solid electrolyte component thereof.

Various refinements of the disclosed brazing methods, brazed joints, and solid-oxide fuel cell assembly methods are possible.

In a refinement, the first metal comprises at least one of nickel, aluminum, cobalt, iron, copper, and combinations thereof (e.g., mixtures or alloys thereof); and the second metal comprises at least one of silver, aluminum, tin, bismuth, nickel, copper, gold, cobalt, and combinations thereof (e.g., mixtures or alloys thereof). Some metals such as aluminum, nickel, cobalt, copper could be useful as either the first or second metal based on its particular melting point relative to the other metal. Examples of specific combinations of first/second metals include Ni/Ag, Fe/Ag, Co/Ag, Al/Sn, Cu/Bi, and Fe/Bi. The first metal is preferably selected for its relative resistance to oxidation, such as Ni, Co, and Fe, which have a high oxidation resistance and a high relative melting point compared to a braze second metal selection. In some cases, the first/second metal combinations are selected such that the first and second metals are relatively immiscible with each other such that bulk braze layer in the final brazed joint is substantially composed of a bulk second metal layer with only minor amounts of the first metal (e.g., up to 2, 5, 10, 20, or 30 wt. % of a minor immiscible component in a primary component), with a large portion of the first metal having migrated to the diffusion layer where it forms a miscible alloy or blend with metallic components diffusing out from the second substrate. In other cases, the porous first metal layer could remain at least partially or substantially intact as a discrete phase of the bulk braze layer. In yet other cases the first metal could be miscible with the second metal and dissolve into the bulk braze second metal layer as a homogeneous component, or the first metal could react with second substrate. Preferably, the first metal, the second metal, and the first substrate are selected based on a relative inability of the second metal to wet the first substrate material in isolation, for example being characterized by wetting/contact angles of the second metal on the first metal or the first substrate material individually of at least 20°, 30°, 40°, or 50 and/or up to at least 150°, 160°, 170° or 180° when measured in air or an inert atmosphere such as nitrogen. The porous nature of the first metal layer promotes efficient wetting by the molten second metal braze of both the porous first metal layer and the first substrate.

In another refinement, the first substrate comprises a ceramic material (e.g., generally an inorganic, non-metallic oxide, nitride or carbide material). In a further refinement, the ceramic material is selected from the group consisting of aluminum oxide, zirconium oxide, cerium oxide, zinc oxide, silicon carbide, silicon nitride, tungsten carbide, and combinations thereof. In a further refinement, the ceramic material comprises a stabilized zirconium oxide (zirconia) (e.g., a ceramic in which the crystal structure of zirconium dioxide is made stabilized at room temperature by an addition of an additional oxide material such as up to about 10 mol. % of the additional oxide). For example, the stabilized zirconium oxide (zirconia) can be selected from the group consisting of yttrium oxide (yttria)-stabilized zirconia (YSZ), calcium oxide (calcia)-stabilized zirconia, magnesium oxide (magnesia)-stabilize zirconia, cerium oxide (ceria)-stabilized zirconia, scandium oxide (scandia)-stabilized zirconia, aluminum oxide (alumina)-stabilized zirconia, cerium oxide, doped cerium oxide, and combinations thereof (e.g., common SOFC solid electrolytes include yttria-stabilized zirconia (YSZ) such as with 8 mol. % yttria, scandia-stabilized zirconia (ScSZ) such as with 9 mol. % scandia, and gadolinium doped ceria (GDC)).

In another refinement, the first substrate comprises a metal material (e.g., comprising at least one of a stainless steel alloy and a nickel-based high-temperature alloy). The first substrate generally can be the same or different metal from the second substrate, when the second substrate is also a metal.

In another refinement, the porous first metal layer has a thickness ranging from 2 μm to 250 μm, such as 5 μm to 40 μm or 10 μm to 30 μm (e.g., at least 2, 3, 5, 8, 10, 15, 20, or 30 μm and/or up to 10, 20, 30, 40, 60, 100, 200, or 250 μm). The porous first metal layer need not have a uniform thickness, and the foregoing thickness values can represent an average layer thickness and/or a range for a spatially variable local layer thickness.

In another refinement, the porous first metal layer comprises pores ranging in size from 10 nm to 50 μm or 1 μm to 50 μm (e.g., at least 10 nm, 100 nm, 500 nm, 750 nm, 1 μm, 2 μm, 3 μm, 5 μm, or 10 μm and/or up to 5, 10, 15, 20, 30, or 50 µm). The foregoing size values can represent an average pore size and/or a range for distributed pores sizes throughout the first metal layer.

In a particular refinement, a pre-sintering step can be used to prepare the porous wetting substrate. For example, providing the porous wetting substrate can comprise: (a1) applying to the first substrate a layer of a first metal mixture comprising a liquid formulation and first metal particles dispersed in the liquid formulation; and (a2) pre-sintering the layer of the first metal mixture (e.g., in a protective pre-sintering atmosphere) at a temperature and pressure sufficient to remove the liquid formulation and at least partially sinter the first metal particles, thereby forming the porous first metal layer. The first metal mixture suitably is in the form of a solution, thick paste, or suspension, etc. that coats the first substrate in the target area of interest. The first metal mixture can include at least 30, 50, or 70 wt. % first metal particles and/or up to 50, 70, or 90 wt. % first metal particles, at least 10, 30, or 50 wt. % liquid formulation and/or up to 30, 50, or 70 wt. % liquid formulation. The liquid formulation can include a liquid solvent medium (e.g., water, isopropanol or other alcohol or organic solvent), a liquid binder to improve green strength (e.g., a polymeric binder dissolved in the solvent medium), and/or a dispersant to prevent agglomeration of the first metal particles in a stable first metal mixture (e.g., a polymeric dispersant dissolved in the solvent medium). Pre-sintering generally includes subjecting the first metal mixture layer to a gradually ramping temperature that removes the liquid formulation, for example degrading, decomposing, etc. any polymer additives therein and at least partially fusing the first metal particles to form the porous first metal layer. Sintering generally includes applying heat and/or pressure a level and time sufficient to fuse the particles of the sintering composition without substantial melting such as to liquefaction.

In another refinement of the pre-sintering step, the liquid formulation comprises a polymeric solution. The liquid formulation can generally include any polymeric binder, dispersant, resin, or other liquid vehicle. In some cases, the polymeric binder can be a curable binder such that the corresponding cured binder or resin is degradable at an intermediate temperature between its curing temperature and the pre-sintering temperature. An example binder system includes ethylene glycol monobutyl ether, ethylene glycol, and isopropanol.

In another refinement of the pre-sintering step, the first metal mixture layer has a thickness ranging from 10 nm to 100 µm or 2 µm to 100 µm, such as 100 nm to 50 µm, 5 µm to 40 µm, or 10 µm to 30 µm (e.g., at least 10 nm, 100 nm, 500 nm, 750 nm, 1 µm, 2 µm, 3 µm, 5 µm, 8 µm, 10 µm, or 15 µm and/or up to 10 µm, 20 µm, 30 µm, 40 µm, 60 µm or 100 µm). The foregoing thickness values can represent an average layer thickness. The first metal mixture layer can be comparable but generally larger in thickness relative to that of the eventual porous first metal layer.

In another refinement of the pre-sintering step, the first metal particles have a size ranging from 10 nm to 50 µm or 2 µm to 50 µm (e.g., a number-, mass-, or volume-average particle size or diameter, such as at least at least 10 nm, 100 nm, 500 nm, 750 nm, 1 µm, 2 µm, 3 µm, 5 µm, 8 µm, or 10 µm and/or up to 10 µm, 20 µm, 30 µm, 40 µm, 50 µm; such as 3 µm to 20 µm or 5 µm to 10 µm). The foregoing ranges can similarly represent the span (such as D10-D90) of the first metal particle size distribution). In a further refinement, the porous first metal layer has a thickness ranging from 1 to 10 (e.g., 1.5 or 2 to 5 or 8) times the average particle size of the first metal particles prior to pre-sintering (e.g., relative to the number-, mass-, or volume-average particle size or diameter of the first metal particles as added to the first metal mixture).

In another refinement of the pre-sintering step, pre-sintering comprises heating the layer of the first metal mixture to a maximum temperature ranging from 100° C. or 600° C. to 1400° C. or 2000° C. (e.g., at least 100° C., 200° C., 300° C., 400° C., 500° C., 600° C., 800° C., or 1000° C. and/or up to 1000° C., 1200° C., or 1400° C.) Alternatively or additionally, pre-sintering heating can comprise heating to a maximum temperature that is at least 20, 25, 50, 100, 200, or 300° C. and/or up to 300, 500, 700, 1000, or 2000° C. lower than the first metal melting point, such as ramping from ambient/room temperature of first metal mixture application at a rate of about 2-10, 50, or 100° C./minute up to the maximum temperature, optionally holding at the maximum temperature for up to 0.1-5 hours, and then reducing the temperature back to ambient/room temperature at a rate of about 2-10, 50, 100, 200, or 300° C./minute. Pre-sintering is performed at a temperature sufficient to eliminate the liquid formulation (e.g., evaporate solvent, decompose/eliminate any polymeric additives), but less than a temperature sufficient to fully sinter the first metal. At such temperatures, partial sintering/fusing of some particles can occur to a degree sufficient to provide a porous first metal structure even in the absence of polymeric additives.

In another refinement of the pre-sintering step, the method comprises performing pre-sintering in a protective pre-sintering atmosphere comprising at least one of argon and nitrogen (e.g., more generally any inert or protective atmosphere that avoids or prevents oxidation of the first metal particles during pre-sintering). The protective pre-sintering atmosphere can be essentially completely inert gases such as argon, nitrogen, or a mixture thereof, such as at least 90, 95, 98, 99, or 99.9 mol. % inert gases. A reducing gas such as hydrogen can be included in the protective atmosphere to protect against oxidation, such as at least 1 or 2 mol. % and/or up to 5 or 10 mol. % reducing gas. The protective atmosphere is generally at a pressure of about 1 atm or slightly higher to limit entry of external air during pre-sintering. The partial pressure of oxygen gas ($pO_2$) in the protective atmosphere is generally selected to maintain a metallic surface on the first metal particles and porous layer, which can vary with the particular type of first metal, but is suitably about $10^{-6}$ atm or less in many cases.

In another refinement, the braze second metal material is in the form of a foil (e.g., a foil or foils having a net thickness of at least 50, 75, or 100 µm and/or up to 100, 150, 200 µm, such as 50-200 µm). The braze second metal material can be a single foil layer or multiple foil layers to form a correspondingly thicker braze joint. More generally, the braze second metal material can be any desired shape or form, such as small pellets or rods of second metal material.

In another refinement, braze second metal material comprises at least 90 wt. % of the second metal (e.g., at least 90, 95, 98, 99, or 99.9 wt. % second metal, with the balance being other alloy or impurity elements).

In another refinement, the braze second metal material is free from air-reactive components (e.g., oxygen-reactive such as reducible or oxidizable species, such as copper, indium, zirconium, titanium, zinc, tin, manganese, lithium, and/or silicon, and further including species containing the foregoing elements (e.g., copper-containing species such as CuO)).

In another refinement, the second substrate comprises a metal material (e.g., comprising at least one of a stainless steel alloy and a nickel-based high-temperature alloy).

In another refinement, brazing comprises heating the pre-braze joint to a maximum temperature ranging from 100° C. or 600° C. to 1200° C. (e.g., at least 100° C., 200° C., 300° C., 400° C., 500° C., 600° C., 800° C., or 1000° C. and/or up to 1000° C., 1100° C., or 1200° C.). Alternatively or additionally brazing can comprise heating to a maximum temperature above the second metal melting point of the second metal but less than the first metal melting point, such as at least 20, 25, 50, 100, 200, or 300° C. and/or up to 300, 500, 700, 1000 or 2000° C. lower than the first metal melting point; such as ramping from ambient/room temperature of forming the pre-braze joint at a rate of about 2-10, 50, or 100° C./minute up to the maximum temperature, optionally holding at the maximum temperature for 0.1-5 hours, and then reducing the temperature back to ambient/room temperature at a rate of about 2-10, 50, or 100° C./minute.

In another refinement, the method comprises performing brazing in a protective brazing atmosphere comprising at least one of argon and nitrogen (e.g., more generally any inert or protective atmosphere that avoids or prevents oxidation of the nickel porous layer during brazing). The protective brazing atmosphere can be essentially completely inert gases such as argon, nitrogen, or a mixture thereof, such as at least 90, 95, 98, 99, or 99.9 mol. % inert gases. A reducing gas such as hydrogen can be included in the protective atmosphere to protect against oxidation, such as at least 1 or 2 mol. % and/or up to 5 or 10 mol. % reducing gas. The protective atmosphere is generally at a pressure of about 1 atm or slightly higher to limit entry of external air during brazing. The partial pressure of oxygen gas ($pO_2$) in the protective atmosphere is generally selected to maintain a metallic surface on the first and second metals, which can vary with the particular type of first and second metals, but is suitably about $10^{-6}$ atm or less in many cases.

In a refinement of the brazed joint, the bulk second metal layer has a first metal concentration of 20 wt. % or less (e.g., comprising at least 0.1, 1, 2, or 5 wt. % and/or up to 5, 10, 15, or 20 wt. % first metal, where the concentration can represent an average concentration across the bulk second metal layer and/or a range spanning/including the local maximum and minimum concentration across the bulk second metal layer); and the diffusion layer is present and has a first metal concentration of at least 10 wt. % and greater than the first metal concentration of the bulk second metal layer (e.g., at least 10, 15, 20, or 30 wt. % and/or up to 30, 40, 50, 60, or 80 wt. % first metal, where the concentration can represent an average concentration across the diffusion layer and/or a range spanning/including the local maximum and minimum concentration across the diffusion layer). Relative high/low concentrations of the first metal in the diffusion layer and the bulk second metal layer can be based on the average first metal values in the corresponding layers.

In another refinement of the brazed joint, the bulk second metal layer has a second metal concentration ranging from 70 wt. % to 99 wt. % (e.g., at least 70, 80, 90, or 95 wt. % and/or up to 75, 85, 95, 98, or 99 wt. % second metal). The concentration can represent an average concentration across the bulk second metal layer and/or a range spanning/including the local maximum and minimum concentration across the bulk second metal layer.

In another refinement of the brazed joint, the bulk second metal layer is substantially free from discrete first particles having a size greater than 1 μm. For example, the original porous first metal layer formed during fabrication can be essentially completely disintegrated. The first metal present in the bulk second metal layer can be in the form of a continuous mixture or alloy with the second metal and not as discrete larger first metal particles such as those originally used to form the porous first metal layer. Alternatively or additionally first metal present in the bulk second metal layer can be present in sub-micron sized discrete particles from the porous first metal layer that were not completely disintegrated during brazing, such as less than 1000, 500, 200, 100, or 10 nm in size whether on average or for the entire distribution.

In another refinement of the brazed joint, the diffusion layer is present and is substantially free from first metal particles. For example, the original porous first metal layer formed during fabrication can be essentially completely disintegrated. The first metal present in the diffusion layer can be in the form of a continuous mixture or alloy of the first metal with minor amounts second metal and metallic components from the second substrate (if applicable) and not as discrete first metal particles. Alternatively, the diffusion layer can additionally include sub-micron size first metal particles as for the bulk second metal layer.

In another refinement of the brazed joint, the diffusion layer is present and comprises the second metal at a concentration ranging from 1 wt. % to 30 or 90 wt. % (e.g., at least 1, 2, 5, 10, 30, 40 or 50 wt. % and/or up to 10, 20, 25, 50, 70, 80 or 90 wt. % second metal). The concentration can represent an average concentration across the diffusion layer and/or a range spanning/including the local maximum and minimum concentration across the diffusion layer. In some cases, the relatively lower second metal values can represent the brazed joint as initially formed; after oxidative use of the brazed joint, second metal can migrate from the bulk second metal layer into the diffusion layer and be present at higher concentrations.

In another refinement of the brazed joint, the first substrate comprises a ceramic material, and the second substrate comprises a metal material. In a further refinement, the diffusion layer is present and the component of the second substrate in the diffusion layer comprises a metallic component of the metal material (e.g., iron in the case of a stainless steel second substrate) at a concentration ranging from 5 wt. % to 80 wt. % (e.g., at least 5, 10, 15, 20, or 30 wt. % and/or up to 30, 40, 50, 60, or 80 wt. % metallic component). The concentration can represent an average concentration across the diffusion layer and/or a range spanning/including the local maximum and minimum concentration across the diffusion layer.

While the disclosed compounds, articles, methods and compositions are susceptible of embodiments in various forms, specific embodiments of the disclosure are illustrated (and will hereafter be described) with the understanding that the disclosure is intended to be illustrative, and is not intended to limit the claims to the specific embodiments described and illustrated herein.

BRIEF DESCRIPTION OF THE DRAWINGS

FIG. 8 shows shear stress and strain curves from symmetric double shear lap samples after various amounts of oxidation.

DETAILED DESCRIPTION

Figure 1:
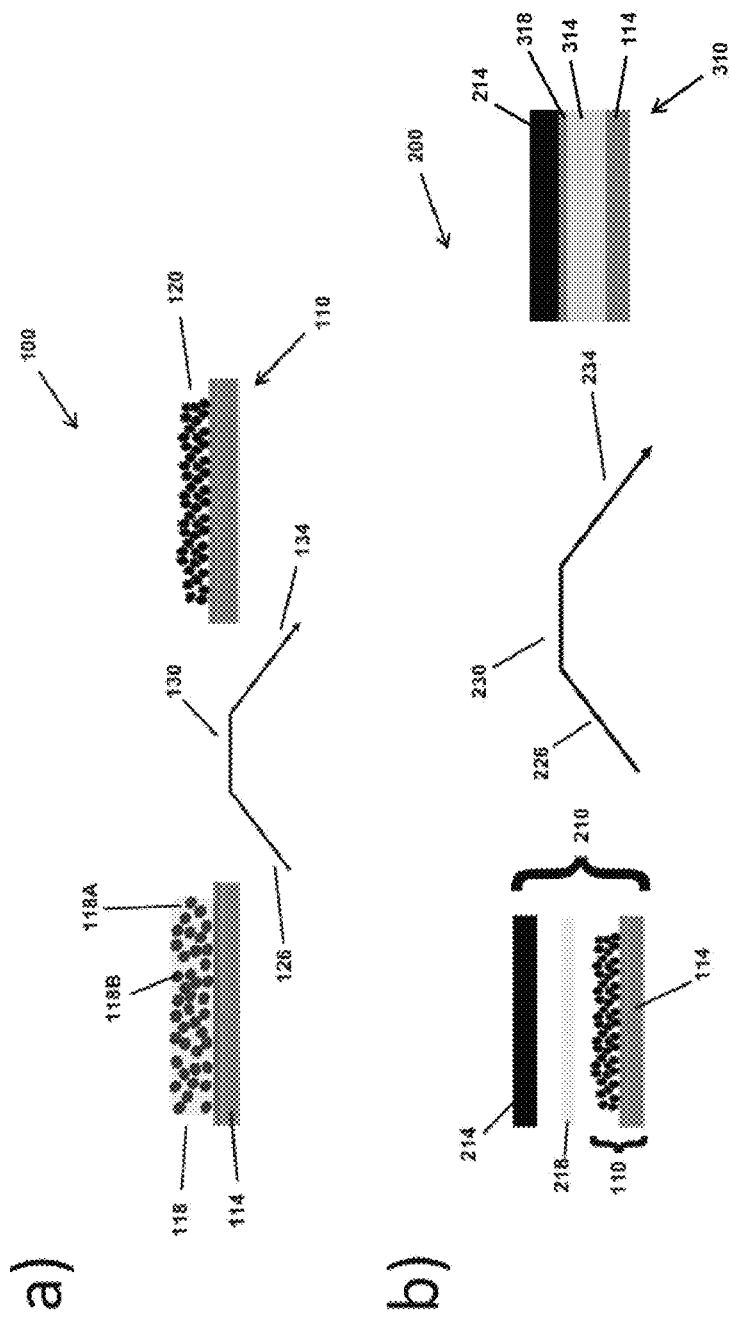
FIG. 1 shows a pre-sintering step (panel A) and a brazing step (panel B) according to methods of the disclosure.

The disclosure provides a brazing method for joining substrates, which method is generally illustrated in FIG. 1. In particular the disclosure provides a brazing method for joining substrates including (a) providing a porous wetting substrate including: (i) an underlying first substrate, and (ii) a porous first metal layer on a surface of the underlying substrate; (b) applying a braze second metal material to the porous wetting substrate and in contact with the porous first metal layer thereon, the second metal having a lower melting point than that of the first metal; (c) applying a second substrate to the braze second metal material, thereby forming a pre-braze joint including the porous wetting substrate, the braze second metal material, and the second substrate; and (d) brazing the pre-braze joint at a temperature and pressure sufficient to melt the braze second metal material, wet pores of the porous first metal layer with the molten braze second metal material, and contact the first substrate with the molten braze second metal material, thereby forming a brazed joint including the first substrate, the second substrate, and a second metal layer joining the first and second substrates.

The disclosure further provides a method of assembling a solid-oxide fuel cell (SOFC) and a brazed joint formed using the method of the disclosure.

Reactive air Ag—CuO brazes are the most widely used SOFC brazes today. Unfortunately, however, the high ~45° wetting angle of the conventional Ag-4 wt % Cu braze often leads to braze joint manufacturing defects and a useful lifetime of about only 10,000 hours. Furthermore, the reduction of CuO during dual atmosphere ($H_2/O_2$) SOFC operation results in pores that: i) mechanically weaken the braze interfaces, and ii) provide a short-circuit path for $H_2$ invasion into the center of the braze, thereby hastening the development of gaseous water pockets formed when oxygen and hydrogen meet within the braze and reducing the mechanical strength of the braze.

Advantageously, the disclosure provides porous metal layers, instead of reactive air element additions, that allow substrates difficult to wet with molten braze material (e.g., ceramics such as yttria-stabilized zirconia (YSZ), etc.) to form braze joints with metal substrates (e.g. stainless steel) using reactive-element-free, metal-based brazes. Therefore, the disclosure provides a method of brazing to join two substrates that eliminates the formation of pores from CuO reduction in an SOFC, thereby increasing the braze joint reliability, operational robustness, and lifetime.

Table 1, below, shows that the inert atmosphere porous-metal-enabled brazing approach of the disclosure has many advantages over conventional reactive air brazing. Brazing in inert atmosphere prevents oxidation of the metal(s), but unlike vacuum or hydrogen brazing, it does not utilize oxygen partial pressures that adversely affect the mechanical and electrochemical properties of oxygen-partial-pressure-sensitive SOFC cathode materials.

TABLE 1

Comparison of Conventional Reactive Air vs. Porous-Metal Enabled Brazing

| Pore Type | Reactive Air Brazing | Porous-Metal-Enabled Brazing |
| --- | --- | --- |
| Type I (wetting) | $\Theta = 45°$ and organic materials in braze paste lead to pores during manufacture | $\Theta < 30°$ and no present organics lead to fully infiltrated porous metal network |
| Type II (interfacial) | CuO reduction on YSZ-braze and braze-SS interfaces causes formation of micro-pores during SOFC operation | No oxides present to be reduced by anode gas during SOFC operation |
| Type III ($H_2 + O_2$) | $H_2$ and $O_2$ diffuse through braze to form water pockets, compromising joint after ~10,000 hours of SOFC operation | No Type II pores present to provide short circuit path for $H_2$ during SOFC operation, increasing joint reliability and delaying onset of Type III pores. |

Substrates

The first, i.e., underlying, substrate and the second substrate of the disclosure are not particularly limited. That is, the brazing method of the disclosure is applicable to any two substrates that are suitable for brazing applications. For example, the substrates can include, but are not limited to, ceramic materials or metal materials.

As used herein, the terms "first substrate," "underlying substrate," and "underlying first substrate" are used interchangeably, generally referring to a substrate including a porous metal layer thereon to improve wetting and adhesion after brazing (e.g., considering the substrate to be "under" the porous metal layer).

In embodiments, the underlying first substrate includes a ceramic material. In embodiments, the second substrate includes a ceramic material. As used herein, a "ceramic material" refers to an inorganic, non-metallic oxide, nitride, or carbide material. The ceramic material can include aluminum oxide, zirconium oxide, cerium oxide, zinc oxide, silicon carbide, silicon nitride, or tungsten carbide. In embodiments, the ceramic material is selected from the group consisting of aluminum oxide, zirconium oxide, cerium oxide, zinc oxide, silicon carbide, silicon nitride, and tungsten carbide. In embodiments, the ceramic metal includes stabilized zirconium oxide, i.e., zirconia. As used herein, the terms "stabilized zirconium oxide" and "stabilized zirconia" are used interchangeably, and refer to a ceramic material in which the crystal structure of zirconium dioxide is made stabilized at room temperature by an addition of an additional oxide material, such as up to about 10 mol. % of the additional oxide material. The stabilized zirconia can include, for example, yttrium oxide (yttria)-stabilized zirconia (YSZ), calcium oxide (calcia)-stabilized zirconia, magnesium oxide (magnesia)-stabilize zirconia, cerium oxide (ceria)-stabilized zirconia, scandium oxide (scandia)-stabilized zirconia, aluminum oxide (alumina)-stabilized zirconia, cerium oxide, doped cerium oxide, or combinations thereof. In embodiments, the stabilized zirconium oxide (zirconia) is selected from the group consisting of yttrium oxide (yttria)-stabilized zirconia (YSZ), calcium oxide (calcia)-stabilized zirconia, magnesium oxide (magnesia)-stabilize zirconia, cerium oxide (ceria)-stabilized zirconia, scandium oxide (scandia)-stabilized zirconia, aluminum oxide (alumina)-stabilized zirconia, cerium oxide, doped cerium oxide, and combinations thereof. Commonly, SOFC solid electrolytes include yttria-stabilized zirconia, such as with 8 mol. % yttria, scandia-stabilized zirconia (ScSZ), such as with 9 mol. % scandia, and gadolinium doped ceria (GDC).

In embodiments, the underlying first substrate includes a metal material. In embodiments, the second substrate includes a metal material. Suitable metal materials can include stainless steel alloy and nickel-based high-temperature alloy. In embodiments, the first substrate includes at least one of a stainless steel alloy and nickel-based high temperature alloy. In embodiments, the second substrate includes at least one of a stainless steel alloy and a nickel-based high-temperature alloy. One example of a suitable stainless steel alloy is stainless steel 441, an 18% chromium, dual stabilized ferritic stainless steel.

In embodiments wherein both the first substrate and the second substrate include metal materials, the first substrate can be the same or different metal from the second substrate. In embodiments wherein both the first substrate and the second substrate include ceramic materials, the first substrate can be the same or different ceramic material from the second substrate.

Metal Layers

The disclosure provides a porous wetting substrate including the underlying first substrate as described, and a porous first metal layer on a surface thereof. Further provided is a braze second metal material applied to the porous wetting substrate and in contact with the porous first metal layer thereon.

The porous first metal layer is not particularly limited. For example, the porous first metal layer includes a first metal, wherein the first metal includes at least one of nickel, aluminum, cobalt, iron, copper, or combinations thereof. Furthermore, the porous first metal layer can include mixtures and alloys of nickel, aluminum, cobalt, iron, and/or copper.

The porous first metal layer can have a thickness ranging from about 10 nm to about 250 μm, about 2 μm to about 250 μm, about 5 μm to about 100, about 10 μm to about 75 μm, or about 25 μm to about 50 μm, for example, about 10 nm, 100 nm, 250 nm, 500 nm, 750 nm, 1 μm, 2 μm, 3 μm, 5 μm, 8 μm, 10 μm, 15 μm, 20 μm, 30 μm, 40 μm, 60 μm, 75 μm, 100 μm, 125 μm, 150 μm, 175 μm, 200 μm, or 250 μm. The porous first metal layer need not have a uniform thickness, and the foregoing thickness values can represent an average thickness of the porous first metal layer and/or a range for a spatially variable local layer thickness.

The porous first metal layer can include pores ranging in size from about 10 nm to about 50 μm, about 1 μm to about 50 μm, about 5 μm to about 30 μm, or about 10 to about 20 μm, for example about 10 nm, 100 nm, 250 nm, 500 nm, 750 nm, 1 μm, 2 μm, 3 μm, 4 μm, 5 μm, 7 μm, 10 μm, 15 μm, 20 μm, 25 μm, 30 μm, 35 μm, 40 μm, 45 μm, or 50 μm. The foregoing pore size values can represent an average pore size and/or a range for distributed pore sizes throughout the porous first metal layer.

The first metal is selected for its relative resistance to oxidation, such as nickel, cobalt, and iron, which have a high oxidation resistance and a high relative melting point compared to the braze second metal material, or simply, the second metal material.

In embodiments, the first metal has a higher melting point than the second metal material. Some metals such as aluminum, nickel, cobalt, and copper may be useful as either the first or the second metal material based on its particular melting point relative to the other metal. Examples of specific combinations of the first/second metal can include Ni/Ag, Fe/Ag, Co/Ag, Al/Sn, Cu/Bi, and Fe/Bi. In some embodiments, the first and second metal combinations are selected such that the first and second metals are relatively immiscible in each other, such that the bulk braze layer in the final brazed joint is substantially composed of a bulk second metal layer with only minor amounts of the first metal, wherein a large portion of the first metal has migrated to the diffusion layer where it forms a miscible alloy or blend with metallic components diffusing out from the second substrate. As used herein, "minor amounts of the first metal" means that no more than 30 wt. %, no more than 20 wt. %, no more than 10 wt. %, no more than 5 wt. %, or no more than 2 wt. % of the immiscible first metal is present in the bulk second metal layer of the final brazed joint. In addition, or alternatively, the porous first metal layer can remain at least partially or substantially intact as a discrete phase of the bulk braze layer. That is, the final brazed joint may include a discrete porous first metal layer, and a discrete braze second metal material layer. Furthermore, the first metal can be miscible with the second metal, thereby dissolving into the bulk braze second metal layer as a homogeneous component. Additionally, the first metal can react with the second substrate.

Generally, the first metal, the second metal, and the first substrate are selected based on a relative inability of the second metal to wet the first substrate in isolation. That is, the second metal may, when measured in air or an inert atmosphere such as nitrogen, have a contact angle on the first metal or the first substrate of at least about 20°, about 30°, about 40°, about 50°, about 75°, about 100°, about 150°, or about 180°. Without intending to be bound by theory, the porous nature of the first metal layer promotes efficient wetting by the molten second metal braze of both the porous first metal layer and the first substrate.

In embodiments, the braze second metal material is in the form of a foil. The foil, or foils, may have a net thickness of from about 50 μm to about 200 μm, about 75 μm to about 150 μm, or about 100 μm to about 125 μm, for example about 50, 75, 100, 125, 150, 175, or 200 μm. The braze second metal material can be a single foil layer or multiple foil layers to form a correspondingly thicker braze joint. More generally, the braze second metal material can be any desired shape or form, such as small pellets or rods of the second metal material.

In embodiments, the braze second material includes at least 90 wt. % of the second metal materials. That is, the braze second material includes at least 90 wt. %, at least 95 wt. %, at least 98 wt. %, at least 99 wt. %, at least 99.9 wt. % of the second metal, with the balance being other alloy and/or impurity elements.

Generally, the braze second metal material is free of air-reactive components. That is, the braze second metal material is free from oxygen-reactive, such as reducible or oxidizable species. Examples of said oxygen-reactive species include elements such as copper, indium, zirconium, titanium, zinc, tin, manganese, lithium, and/or silicon. Furthermore, an oxygen-reactive species can include and any species that includes the foregoing elements, such as copper-containing species such as CuO.

Pre-Sintering Step

A pre-sintering step 100 can be used to prepare the porous wetting substrate 110. The pre-sintering step 100 can include applying to the first substrate 114 a layer of the first metal 118, as described, in a mixture including a liquid formulation 118A and first metal particles 118B dispersed in the liquid formulation 118A, and pre-sintering the layer of the first metal mixture 118 at a temperature and pressure sufficient to remove the liquid formulation 118A and at least partially sinter the first metal particles 118B, thereby forming the porous first metal layer 120. The layer of the first metal mixture 118 can be pre-sintered to the first substrate 114 in a protective pre-sintering atmosphere.

As described, the first metal is generally prepared as a mixture 118 in the pre-sintering step 100. The first metal mixture 118 may be in the form of a solution, thick paste, suspension, or the like, that coats the first substrate 114 in the target area of interest, that is, the area to be adjoined to the second substrate 214 in the brazed joint.

The first metal mixture 118 can include from about 30 wt. % to about 90 wt. %, about 40 wt. % to about 70 wt. %, or about 50 wt. % to about 60 wt. % first metal particles 118B, for example, about 30, 35, 40, 45, 50, 55, 60, 65, 70, 75, 80, 85, or 90 wt. % first metal particles 118B. Accordingly, the first metal mixture 118 can include from about 10 wt. % to about 70 wt. %, about 30 wt. % to about 60 wt. %, or about 40 wt. % to about 50 wt. % liquid formulation 118A, for example about 10, 15, 20, 25, 30, 35, 40, 45, 50, 55, 60, 65, or 70 wt. % liquid formulation 118A.

The liquid formulation 118A can include a liquid solvent medium. Suitable solvent media include, but are not limited to, water, isopropanol or other alcohol or organic solvent. In embodiments, the liquid formulation 118A includes a polymeric solution. For example, the liquid formulation 118A can include a liquid binder, such as a polymeric binder dissolved in the solvent medium, to improve green strength. In embodiments, the polymeric binder can be a curable binder such that the corresponding cured binder or resin is degradable at an intermediate temperature between its curing temperature and the pre-sintering temperature. Examples of suitable polymeric binders include, but are not limited to, ethylene glycol monobutyl ether, ethylene glycol, and isopropanol. The liquid formulation 118A can also include a dispersant, such as a polymeric dispersant dissolved in the solvent medium, to prevent agglomeration of the first metal particles in the stable first metal mixture. Generally, the liquid formulation 118A can include any polymeric binder, dispersant, resin, or other liquid vehicle.

The first metal mixture layer 118 can have a thickness prior to pre-sintering ranging from about 10 nm to about 250 μm, about 2 μm to about 100 μm or 250 μm, about 5 μm to about 60 μm or 100 μm, about 10 μm to about 40 μm or 75 μm, or about 20 μm to about 30 μm or 50 μm, for example, about 10 nm, 100 nm, 500 nm, 750 nm, 1 μm, 2 μm, 3 μm, 4 μm, 5 μm, 6 μm, 7 μm, 8 μm, 9 μm, 10 μm, 12 μm, 14 μm, 15 μm, 17 μm, 20 μm, 25 μm, 30 μm, 35 μm, 40 μm, 45 μm, 50 μm, 55 μm, 60 μm, 65 μm, 70 μm, 75 μm, 80 μm, 85 μm, 90 μm, 95 μm, 100 μm, 125 μm, 150 μm, 175 μm, 200 μm, or 250 μm. The foregoing ranges can similarly represent an average layer thickness. The first metal mixture layer 118 can be comparable, but generally larger in thickness, relative to that of the eventual porous first metal layer 120.

The first metal mixture layer 118 can include first metal particles 118B having a size ranging from about 10 nm to about 50 μm, about 2 μm to about 50 μm, about 3 μm to about 40 μm, about 5 μm to about 30 μm, or about 10 μm to about 20 μm, for example, about 10 nm, 250 nm, 500 nm, 750 nm, 1 μm, 2 μm, 3 μm, 4 μm, 5 μm, 6 μm, 7 μm, 8 μm, 9 μm, 10 μm, 15 μm, 20 μm, 25 μm, 30 μm, 35 μm, 40 μm, 45 μm, or 50 μm. The size of the first metal particles 118B can be expressed in terms of a number-, mass-, or volume-average particle size or diameter. The foregoing ranges can similarly represent the span (such a D10 to D90) of the first metal particle size distribution. In embodiments, the porous first metal layer 120, that is the layer formed as a result of the pre-sintering step 100, can have a thickness ranging from about 1 to about 10, from about 1.5 to about 8, or from about 2 to about 5 times the average particle size of the first metal particles 118B in the first metal mixture layer 118 prior to pre-sintering. For example, the porous first metal layer 120 can have a thickness of about 1, 1.5, 2, 3, 4, 5, 6, 7, 8, 9, or 10 times the number-, mass-, or volume-average particles size or diameter of the first metal particles 118B as added to the first metal mixture 118.

Generally, the pre-sintering step can include first subjecting the first metal mixture layer to a gradually ramping temperature that removes the liquid formulation by, for example, degrading or decomposing the polymer additives therein, and at least partially fusing the first metal particles to form the porous first metal layer. Sintering generally includes applying heat and/or pressure at a level and time sufficient to fuse the particles of the sintering composition without substantial melting such as to liquefaction.

According to the disclosure, the pre-sintering step 100 can include heating the layer of the first metal mixture 118 once applied to the first substrate 114 to a maximum temperature 130 ranging from about 100° C. or 600° C. to about 1400° C., about 800° C. to about 1200° C., or about 1000° C. to about 1100° C., for example about 100, 200, 300, 400, 500, 600, 650, 700, 750, 800, 850, 900, 950, 1000, 1050, 1100, 1150, 1200, 1250, 1300, 1350, or 1400° C. Additionally, or alternatively, the pre-sintering step 100 can include heating to a maximum temperature 130 that is at least from about 20° C. to 2000° C., about 100° C. to about 700° C., about 200° C. to about 500° C., or about 300° C. to about 400° C. lower than the melting point of the first metal. The maximum temperature 130 can be reached by, for example, ramping 126 from ambient/room temperature of the first metal mixture layer 118 at a rate of about 2° C./min to about 100° C./min, or about 10° C./min to about 50° C./min (e.g., about 5° C./min), up to the maximum temperature 130. Optionally, the first substrate 114 having the first metal mixture layer 118 thereon can be held at the maximum temperature (or the "holding temperature") 130 for a period from about 0.1 hours to about 5 hours, about 0.5 hours to about 3 hours, or about 1 hour to about 2 hours, for example about 0.1, 0.3, 0.5, 0.7, 1, 2, 3, 4, or 5 hours. After the first substrate 114 having the first metal mixture layer 118 thereon is optionally held at the holding temperature 130 for the desired period of time, or after the maximum temperature is reached in embodiments wherein there is no holding period, the temperature can be reduced 134 back to ambient temperature at a rate of about 2° C./min to about 100° C./min, or about 10° C./min to about 50° C./min (e.g., about 5° C./min), down ambient/room temperature to provide a porous first metal layer 120.

In general, the pre-sintering step 100 is performed at a temperature sufficient to eliminate the liquid formulation 118A, but less than a temperature sufficient to fully sinter the first metal. That is, the pre-sintering step 100 is performed at a temperature to sufficiently evaporate solvent, and decompose or otherwise eliminate any polymeric additives, while forming a partially sintered, porous first metal layer 120. At such temperatures, partial sintering or fusing of some of the first metal particles 118B to the first substrate 114 can occur to a degree sufficient to provide a porous wetting substrate 110, even in the absence of polymeric additives.

As described, the pre-sintering step 100 can be performed in a protective pre-sintering atmosphere. The protective pre-sintering atmosphere is any inert and/or protective atmosphere that avoids or prevents oxidation of the first metal particles during the pre-sintering step. Accordingly, the protective pre-sintering atmosphere can include at least one of argon and nitrogen.

The protective pre-sintering atmosphere can be essentially completely inert gases such as argon, nitrogen, or a mixture thereof. As used herein, "essentially completely inert gases" means that the protective atmosphere includes at least 90 mol. %, at least 95 mol. %, at least 98 mol. %, at least 99 mol. % or at least 99.9 mol. % inert gases. In addition to the inert gas, a reducing gas, such as hydrogen, can be included in the protective pre-sintering atmosphere to prevent against oxidation. The reducing gas can be included in an amount of up to 10 mol. %, up to 5 mol. %, up to 2 mol. %, up to 1 mol. % or up to 0.1 mol. % of the protective pre-sintering atmosphere.

The protective pre-sintering atmosphere is generally at a pressure of 1 atm or slightly higher to limit entry of external air during pre-sintering. The partial pressure of oxygen gas ($pO_2$) in the protective pre-sintering atmosphere is generally selected to maintain a metallic surface on the first metal particles and porous first metal layer, which can vary with the particular type of first metal, but is suitably about $10^{-6}$ atm or less.

Brazing Step

The disclosure provides brazing 200 a pre-braze joint 210 including the porous wetting substrate 110, the second substrate 214, and the braze second metal material 218, as described, at a temperature and pressure sufficient to melt the braze second metal material 218, wet pores of the porous first metal layer 110 with the molten braze second metal material 218, and contact the first substrate 114 with the molten braze second metal material 218, thereby forming a brazed joint including the first substrate 114, the second substrate 214, and a second metal layer 218 joining the first 114 and second 214 substrates.

The brazing can include heating the pre-braze joint 210 to a maximum temperature 230 ranging from about 100° C. or 600° C. to about 1200° C. or 2000° C., about 700° C. to about 1100° C., or about 800° C. to about 1000° C., for example about 100, 200, 300, 400, 500, 600, 650, 700, 750, 800, 850, 900, 950, 1000, 1050, 1100, 1150, 1200, 1500, 1700, or 2000° C. Alternatively, or additionally, brazing 200 can include heating to a maximum temperature 230 above the melting point of the second metal material 218, but less than that of the first metal material 118B. That is, the brazing 200 can include heating to a maximum temperature 230 ranging from at least 20° C. to about 2000° C., about 25° C. to about 700° C., about 50° C. to about 500° C., or about 100° C. to about 300° C. below the melting point of the first metal 118, for example about 20, 25, 50, 100, 150, 200, 25, 300, 350, 400, 450, 500, 550, 600, 650, 700, 1000, or 2000° C. lower than the melting point of the first metal 118.

Similar to the pre-sintering step 100, the brazing step 200 can include ramping 226 the temperature of the pre-braze joint 210 from ambient/room temperature to the maximum temperature 230, holding at the maximum, or "holding," temperature 230, and ramping back down 234 to ambient/room temperature. For example, the temperature can be ramped 226 from ambient/room temperature of the pre-braze joint at a rate of about 2° C./min to about 100° C./min, or about 10° C./min to about 50° C./min (e.g., about 5° C./min), up to the maximum temperature 230. Optionally, the pre-braze joint 210 can be held at the maximum temperature 230 for a period from about 0.1 hours to about 5 hours, about 0.5 hours to about 3 hours, or about 1 hour to about 2 hours, for example about 0.1, 0.15, 0.2, 0.25, 0.3, 0.5, 0.7, 1, 2, 3, 4, or 5 hours. After pre-braze joint 210 is held at the holding temperature 230 for the desired period of time, the temperature can be reduced 234 at a rate of about 2° C./min to about 300° C./min, about 2° C./min to about 100° C./min, or about 10° C./min to about 50° C./min (e.g., about 5° C./min), down to ambient/room temperature to provide the final brazed joint.

The brazing step 200 can be performed in a protective brazing atmosphere. The protective brazing atmosphere can include any inert or protective atmosphere that avoids or prevents oxidation of the nickel porous layer during brazing. In embodiments, the protective brazing atmosphere includes at least one of argon and nitrogen. The protective brazing atmosphere can be essentially completely inert gases such as argon, nitrogen, or a mixture thereof. That is, the protective brazing atmosphere can include at least 90 mol. %, at least 95 mol. %, at least 98 mol. %, at least 99 mol. % or at least 99.9 mol. % inert gases. In addition to the inert gas, a reducing gas, such as hydrogen, can be included in the protective brazing atmosphere to prevent against oxidation. The reducing gas can be included in an amount of up to 10 mol. %, up to 5 mol. %, up to 2 mol. %, up to 1 mol. % or up to 0.1 mol. % of the protective brazing atmosphere.

The protective brazing atmosphere is generally at a pressure of 1 atm or slightly higher to limit entry of external air during pre-sintering. The partial pressure of oxygen gas ($pO_2$) in the protective brazing atmosphere is generally selected to maintain a metallic surface on the first and second metals, which can vary with the particular types of first and second metals, but is suitably about $10^{-6}$ atm or less.

Brazed Joint

The disclosure provides a brazed joint 310 including a first substrate 114, a bulk second metal layer 314 adjacent to the first substrate 114, the bulk second metal layer 314 including a first metal 118B and the second metal 218, the first metal 118B being at a lower concentration than the second metal 218 in the bulk second metal layer 314, optionally a diffusion layer 318 adjacent to the bulk second metal layer 314, the diffusion layer 318 including the first metal 118B and at least one component of a second substrate 214 adjacent to the diffusion layer 318, and a second substrate 214 adjacent to the diffusion layer 318 (when present) or the bulk second metal layer 314 (when the diffusion layer is absent).

The concentration of the first metal layer 118B in the bulk second metal layer 314 is generally less than about 20 wt. %, less than 15 wt. %, less than 10 wt. %, less than 5 wt. %, less than 2 wt. %, less than 1 wt. %, or less than 0.1 wt. %. The foregoing concentration values can represent an average concentration across the bulk second metal layer 314 and/or a range spanning or including the local maximum and minimum concentration across the bulk second metal layer.

The brazed joint 310 can include a diffusion layer 318, that is, a layer at the interface of the bulk second metal material 314 and the second substrate 214 including metallic components diffusing out from the second substrate 214 and, optionally, first metal particles 118B. The diffusion layer 318 can include a first metal concentration of at least 10 wt. % and greater than the concentration of the first metal 118B in the bulk second metal layer 314. For example, the diffusion layer 318 can include at least 10, 15, 20, 30, 40, 50, 60, 70, or 80 wt. % of the first metal 118B, wherein the concentration can represent an average concentration across the diffusion layer 318 and/or a range spanning or including the local maximum and minimum concentrations across the diffusion layer 318. Relative high/low concentrations of the first metal 118B in the diffusion layer 318 and the bulk second metal layer 314 can be based on the average first metal values in the corresponding layers.

Alternatively, in embodiments wherein a diffusion layer is present, the diffusion layer 318 can be substantially free of first metal particles 118B. For example, the original porous first metal layer 120 formed during fabrication can be essentially completely disintegrated. Alternatively, the first metal 118B present in the diffusion layer 318 can be in the form of a continuous mixture or alloy of the first metal 118B with minor amounts of second metal and metallic components from the second substrate 214, and not as discrete first metal particles 118B. Alternatively, or additionally, the diffusion layer 318 can include sub-micron sized first metal particles 118B, such as less than 1000 nm, less than 500 nm, less than 200 nm, less than 100 nm, or less than 10 nm in size, whether on average or for the entire distribution of first metal particles in the diffusion layer.

The bulk second metal layer 314 of the brazed joint 310 can have a second metal 218 concentration ranging from about 70 wt. % to about 99.9 wt %, about 80 wt. % to about 98 wt. %, or about 85 wt. % to about 95 wt. %, for example at least about 70, 75, 80, 85, 90, 95, 98, 99, or 99.9 wt %. The concentration can represent an average concentration across the bulk second metal layer 314 and/or a range spanning or including the local maximum and minimum concentrations across the bulk second metal layer 314.

In embodiments, the bulk second metal layer 314 is substantially free from discrete first metal particles 118B having a size greater than 1 μm. That is, the original porous first metal layer 120 formed during fabrication can be essentially completely disintegrated. Alternatively, the first metal 118B can be present in the bulk second metal layer 314 in the form of a continuous mixture or alloy with the second metal and not as discrete larger first metal particles such as those used to form the porous first metal layer 120. Furthermore, alternatively, or additionally, the first metal 118B can be present in the bulk second metal layer 314 as sub-micron sized discrete particles that were not completely disintegrated during brazing, such as less than 1000 nm, less than 500 nm, less than 200 nm, less than 100 nm, or less than 10 nm in size, whether on average or for the entire distribution of first metal particles 118B in the bulk second metal layer 314.

In embodiments wherein the diffusion layer 318 is present, the second metal 218 can be included in the diffusion layer 318. The second metal 218 can be present in the diffusion layer 318 at a concentration ranging from about 1 wt. % to about 30 or 90 wt. %, about 2 wt. % to about 25 wt. % or about 5 wt. % to about 20 wt. %, for example about 1, 2, 3, 4, 5, 6, 7, 8, 9, 10, 15, 20, 25, 30, 40, 50, 60, 70, 80 or 90 wt. %. The concentration can represent an average concentration of the second metal 218 across the diffusion layer 318 and/or a range spanning or including the local maximum and minimum concentration across the diffusion layer 318. In embodiments, the relatively lower second metal values can represent the brazed joint 310 as initially formed. After oxidative use of the brazed joint 310, for example in a solid-oxide fuel cell, the second metal 218 can migrate from the bulk second metal layer 314 into the diffusion layer 318 and be present at higher concentrations.

In embodiments, the first substrate 114 includes a ceramic material and the second substrate 214 includes a metal material. In embodiments, the diffusion layer 318 is present and the component of the second substrate 214 included in the diffusion layer 318 includes a metallic component of the second substrate metal material at a concentration ranging from about 5 wt. % to about 80 wt. %, about 10 wt. % to about 60 wt. %, about 20 wt. % to about 50 wt. %, or about 30 wt. % to about 40 wt. %, for example, about 5, 10, 15, 20, 25, 30, 35, 40, 45, 50, 55, 60, 65, 70, 75, or 80 wt. % metallic component. An example of the metallic component of the second substrate metal material is iron, in the case of a stainless steel second substrate. The concentration can represent an average concentration across the diffusion layer 318 and/or a range spanning or including the local maximum and minimum concentration across the diffusion layer 318.

Assembling Solid-Oxide Fuel Cell

The disclosure provides a method of assembling a solid-oxide fuel cell. The method includes providing the brazed joint 310 of the disclosure, wherein the first substrate 114 includes a ceramic material, and the second substrate 214 includes a metal material, and incorporating the brazed joint 310 into a solid-oxide fuel cell as a stack component thereof.

Advantageously, the solid-oxide fuel cells assembled using the brazed joint of the disclosure have increased lifetime, reliability, and robustness due to the decrease in Type I, Type II, and Type III pores, as previously described.

Because other modifications and changes varied to fit particular operating requirements and environments will be apparent to those skilled in the art, the disclosure is not considered limited to the example chosen for purposes of illustration, and covers all changes and modifications which do not constitute departures from the true spirit and scope of this disclosure.

Accordingly, the foregoing description is given for clearness of understanding only, and no unnecessary limitations should be understood therefrom, as modifications within the scope of the disclosure may be apparent to those having ordinary skill in the art.

All patents, patent applications, government publications, government regulations, and literature references cited in this specification are hereby incorporated herein by reference in their entirety. In case of conflict, the present description, including definitions, will control.

Throughout the specification, where the compounds, compositions, articles, methods, and processes are described as including components, steps, or materials, it is contemplated that the compositions, processes, or apparatus can also comprise, consist essentially of, or consist of, any combination of the recited components or materials, unless described otherwise. Component concentrations can be expressed in terms of weight concentrations, unless specifically indicated otherwise. Combinations of components are contemplated to include homogeneous and/or heterogeneous mixtures, as would be understood by a person of ordinary skill in the art in view of the foregoing disclosure.

EXAMPLES

Example 1—Preparation and Characterization of Samples

Porous nickel layers were applied to NiO-YSZ supported YSZ electrolytes supplied by Delphi Inc., using the following procedure:

First, 99.9% pure Ni powders (Alfa Aesar, Inc.) with particle sizes of 3-7 µm were mixed with a V-737 electronic vehicle (Hereaus, Inc.) in a 2:1 weight ratio to form a paste. This Ni paste was then screen printed onto 25 mm×25 mm trilayer substrates made up of a dense, ~15 µm thick YSZ electrolyte, a ~15 µm thick NiO-YSZ function anode layer and a ~500 µm thick porous NiO-YSZ anode layer. Two passes were used to print each layer, and 10 min of 80° C. drying was used between prints. A 400-mesh screen containing 17.78 µm diameter stainless steel wires at 22° and a 9 µm thick E80 emulsion (Sefar Inc.) was used for screen printing.

Second, in 20 sccm of flowing Ar, the samples were ramped at 5° C./min, held at ~810° C. for 2 h, and cooled to room temperature with a 5° C./min nominal cooling rate to produce partially sintered nickel layers.

Third, a 75 µm thick, ~6.3 mm×6.3 mm piece of 99.95% pure silver foil (Alfa Aesar, Inc.) was sandwiched between the Ni|YSZ|NiO-YSZ substrate and a bare 441 stainless steel sheet (AK Steel Corp.) with a ~20 g weight on top, and the joint assemblies were ramped at 5° C./min, held at ~970° C. for either 15 or 30 min, and cooled to room temperature with a 5° C./min nominal ramp rate in 20 sccm of Ar.

Braze joint oxidation tests were performed by placing joints brazed for 30 min in a static air furnace and ramped at 5° C./min, isothermally held at 750° C. for either 120 or 500 h, and cooled to room temperature with a 5° C./min nominal ramp rate.

Pre-sintered YSZ/Ni samples, as-brazed YSZ|Ni|Ag|441 samples, and oxidation-tested YSZ|Ni|Ag|441 samples were mounted in epoxy (EPOFIX, Buehler Inc.) and mechanically polished with alumina down to 0.3 win in preparation for scanning election microscopy analysis. Backscatter electron (BSE) images were then taken with a MIRA3 SEM (Tescan, Inc.) at various magnifications to examine the pre-sintered nickel layer and braze joint microstructures. Energy dispersive X-ray spectroscopy (EDS) spot and line scans were also performed on sample cross-sections with an EVO LS25 SEM (Zeiss, GmbH) to evaluate phase and elemental distributions across the braze joints.

Pre-Sintered Porous Nickel on YSZ Layers

Figure 2:
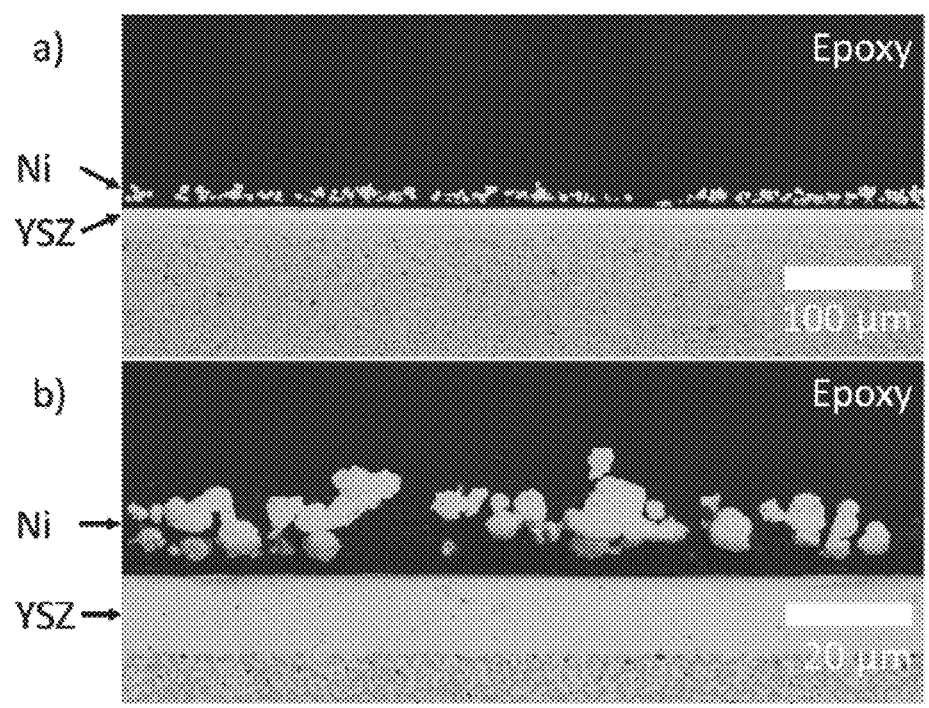
FIG. 2 shows backscatter electron (BSE) images of the morphology of a porous pre-sintered Ni layer on a YSZ substrate at different magnification levels of with a scale bar of 100 μm (panel A) and 20 μm (panel B).

FIG. 2, panels A and B show BSE cross-sections of a pre-sintered YSZ|Ni sample indicating that the procedure produced a laterally continuous, porous Ni layer consisting of 2-5 partially sintered Ni particles.

As-Brazed Joint Microstructure

Figure 3:
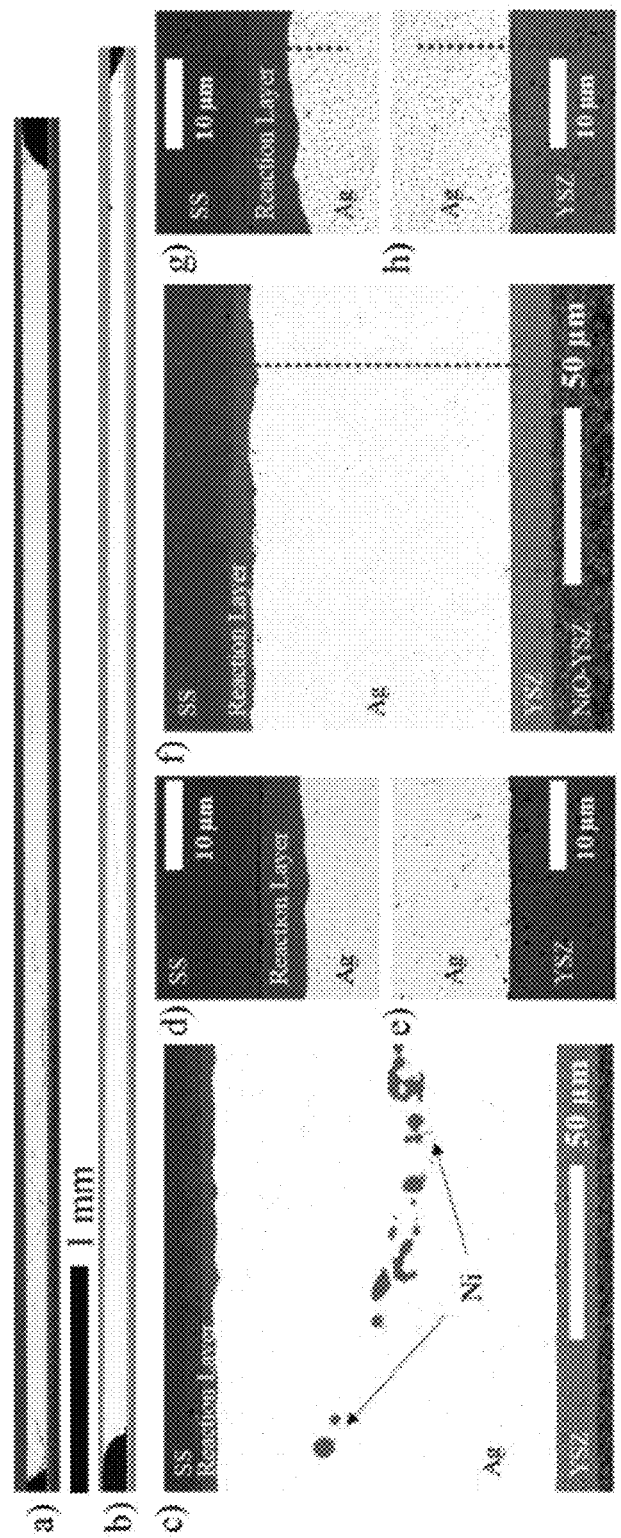
FIG. 3 shows BSE images of an as-brazed joint cross-section brazed for 15 minutes (panel A) and 30 minutes (panel B). Panels C-E show magnified images of representative portions of the 15 minute brazed joint of panel A. Panels F-H show magnified image of representative portions of the 30 minute brazed joint of panel B. Scale bars are 1 mm (panels A and B), 50 µm (panels C and F), and 10 µm (panels D, E G, H).

FIG. 3 shows that both 15 and 30 minutes of brazing in Ar were sufficient to produce pore-free, laterally uniform braze joints. Specifically, FIG. 3 panels A and B show that Ag spontaneously infiltrated the porous Ni layers, enabling the formation of dense, uniformly-thick, braze joints after either 15 minutes (panel A) or 30 minutes (panel B), respectively.

As shown in the higher magnification images, FIG. 3, panels C-E, the porous nickel interlayer originally located at the braze-YSZ interface largely disappeared during 15 min of brazing (some remnants of this layer can be seen in the middle of the silver braze joint in FIG. 3, panels A and C), and a new reaction layer formed at the braze-SS interface. As shown in FIG. 3, panels F-H, 30 min of brazing resulted in the complete elimination of the porous nickel interlayer from the braze-YSZ interface, and a correspondingly thicker reaction layer. In both cases, the silver remained well-bonded to the YSZ even after the porous nickel layer disappeared. FIG. 3 panels C-G also show that there is a very thin (<< 1 µm) residual oxide scale later between the SS and the reaction layer, but that these residual oxides did not adversely affect brazing. In fact, the change in SS contrast above the line of residual surface oxides denoting the original SS-Ag boundary suggested significant intermixing and a strong metallurgical bond between the SS and the reaction layer. Joints brazed upside down achieved the same microstructure as those in FIG. 3, indicating that the chemical potential differences, and not density difference, drove the reaction layer formation.

Figure 4:
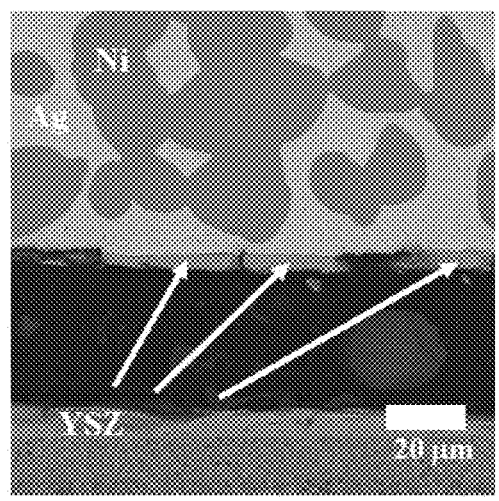
FIG. 4 shows a BSE image of the YSZ-braze interface of an intentionally cracked sample (scale bar 20 µm).

Significantly, the porous pre-sintered nickel layers remained completely intact when brazing was conducted without stainless steel, as shown in FIG. 4. FIG. 4 shows the polished cross-section of an intentionally broken braze joint. Much of the cracking in this sample occurred within the YSZ (and not along the braze-YSZ interface), indicating a strong bond between the Ag and YSZ. This strong bonding agreed with the moderately high Young-Dupre Ag-YSZ work of adhesion of 1.33 J/m$^2$ (estimated with surface energy of silver $r_{Ag}$=1.24 J/m$^2$ and the wetting angle for pure Ag on $ZrO_2$ $\Theta$=85° in air) and the fact that previous work had shown pure-Ag YSZ-SS braze joints have a fracture energy two times higher than conventional Ag—CuO YSZ-SS braze joints.

Compositional Variation Across the Joint

Figure 5:
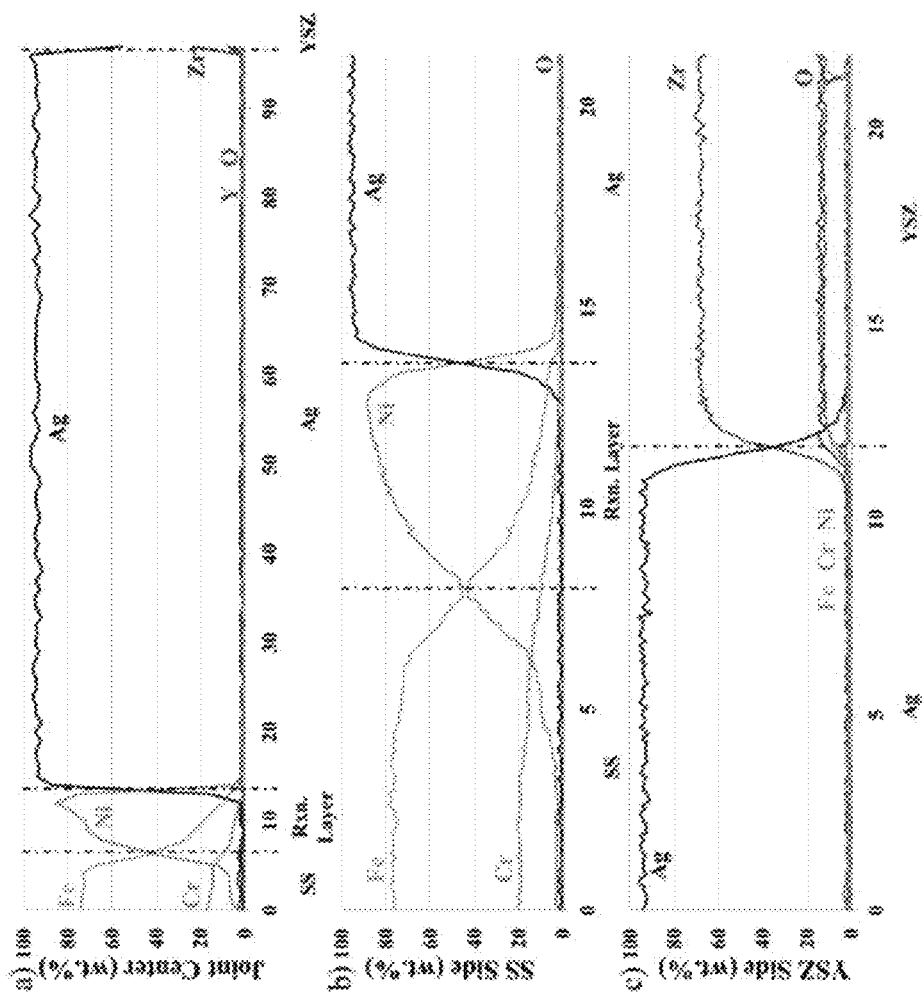
FIG. 5 shows energy-dispersive X-ray spectroscopy (EDS) line scans across a 30 minute as-brazed sample (panel A); across the as-brazed sample's braze-SS interface (panel B) across; and, across the as-brazed sample's YSZ-braze interface, at the locations indicated in FIG. 3, panels F-H, respectively.

FIG. 5, panels A-C show results of 30 min brazed joint EDX compositional analyses collected along the dotted lines in FIG. 3 F-H, respectively. As shown in FIG. 5 panel A, and FIG. 3 panel F, most of the as-produced braze joint consisted of high-purity silver, consistent with the low solubility of nickel, iron, and chromium in silver. Hence, the braze joints are expected to benefit from the large ductility of silver. This high ductility provided a stress-relief mechanism that allows the YSZ-SS braze joints made with Ag—Cu brazes to survive for extended thermal cycling, despite the fact that YSZ, 441 SS, and silver have 25-1000° C. coefficients of thermal expansion of ~8.9-10.6, ~9.3-13.5, and ~15-25 ppm/K, respectively.

FIG. 5 panel B shows that the braze-SS reaction layer included nickel from the porous interlayer and diffused Fe and Cr from the SS. The lack of discrete nickel particles within a silver matrix in the reaction layer, the fact that samples brazed upside down form the same microstructures (as shown in FIG. 3), and the presence of nickel interlayer remnants in FIG. 3 panels A and C braze interiors, suggest that both atomic diffusion and convective transport assisted in the disintegration or dissolution of the porous nickel interlayer and the formation of a reaction layer. FIG. 5 panels A and B also show good nickel, iron, and chromium interdiffusion across the SS-reaction layer interface, suggesting a strong metallurgical bond between these layers.

FIG. 5 panel C shows that a compositionally "sharp" Ag-YSZ interface formed after the porous nickel interlayer disappeared. Notably, the "diffusion distance" implied by the apparent gradual transitions of the Ag, Y, Zr, and O content across the transition is equal to ~3 μm estimated EDS electron beam interaction volume diameter, and therefore cannot be interpreted as intermixing of Ag and YSZ.

Post-Oxidation Braze Joint Microstructure

Figure 6:
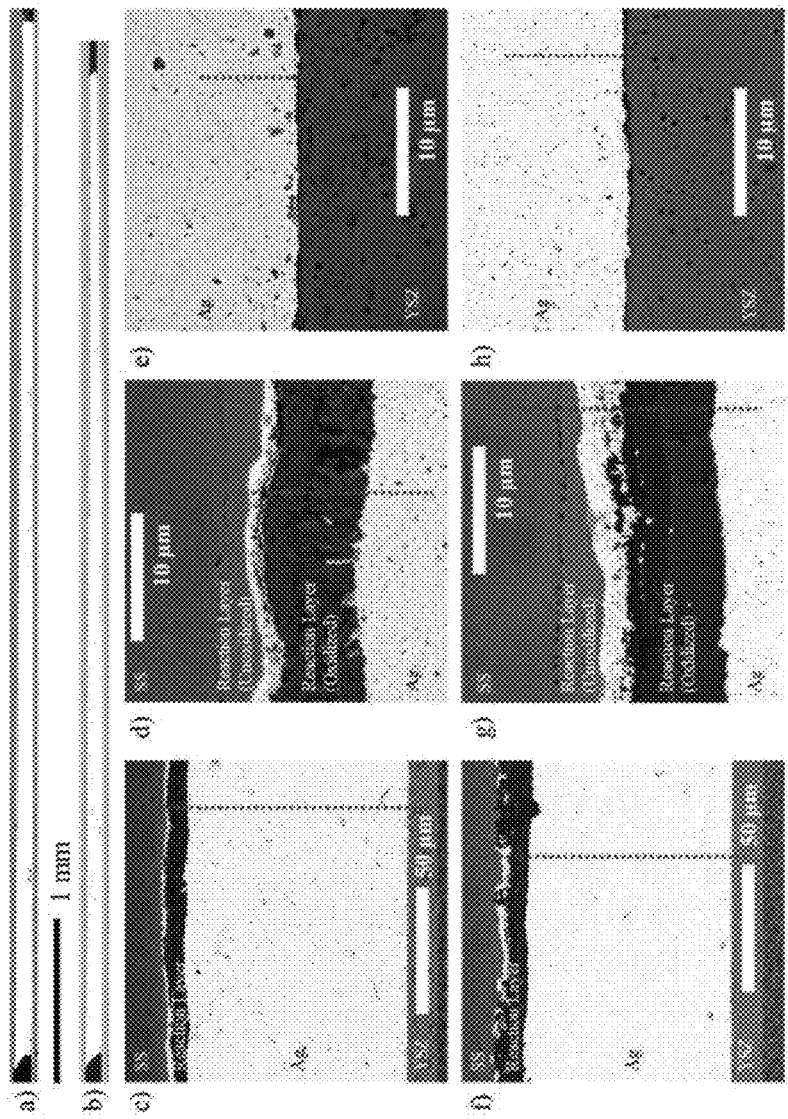
FIG. 6 shows BSE images of an entire 120 h 750° C. oxidized brazed joint cross-section (panel A); an entire 500 h 750° C. oxidized braze joint cross-section (panel B); higher magnification representative images of the 120 h 750° C. oxidized braze joint (panels C-E); and higher magnification representative images of the 500 h 750° C. oxidized braze joint (panels F-H). Scale bars are 1 mm (panels A and B), 50 µm (panels C and F), and 10 µm (panels D, E G, H).

FIG. 6, panels A, C-E and panels B, F-H show the 30 min brazed joint microstructure after 120 and 500 h of 750° C. oxidation in air, respectively. In both cases, the braze joints remained solid and dense after oxidation and the braze remained bonded to both the SS and the YSZ. Further, the majority of the braze joint, which included high-purity silver, was microstructurally unaffected by the long-term exposure to 750° C. air. The lateral continuity of FIG. 6 panels A and B braze joint microstructures, and the similarities between the 120 and 500 h oxidized braze joint microstructures suggest that 120 h provided sufficient time for oxygen to diffuse into all portions of the braze joint.

FIG. 6 panels C-G show that the Ni-rich portion of the reaction layer oxidized and formed two distinct layers, each with reduced porosity with increasing oxidation time. This is consistent with the fact that 1) pure Ni oxidizes quickly in 750° C. air, 2) Ag has a high oxygen ion conductivity of $1.5 \times 10^{-5}$ cm$^2$ s at 750° C., and 3) the Ni-rich portion of the reaction layer was adjacent to the thick silver layer at the interior of the braze joint. FIG. 6 also shows that the Fe and Cr rich portion of the reaction layer did not oxidize and that thin silver layer (denoted Ag*) often separated the oxidized and unoxidized portion of the reaction layer. Without intending to be bound by theory, given the high ductility of pure Ag, it is plausible that the Ag* layer formed from silver squeezed against the unoxidized portion of the reaction layer by the volume expansion and associated cracking of the oxidized portion of the reaction layer.

FIG. 6 panels A and H show that except for a thin dark phase forming at the interface, the oxidized braze-YSZ interface microstructure did not change with long-term 750° C. oxidation.

Post-Oxidation Braze Joint Compositional Analysis

Figure 7:
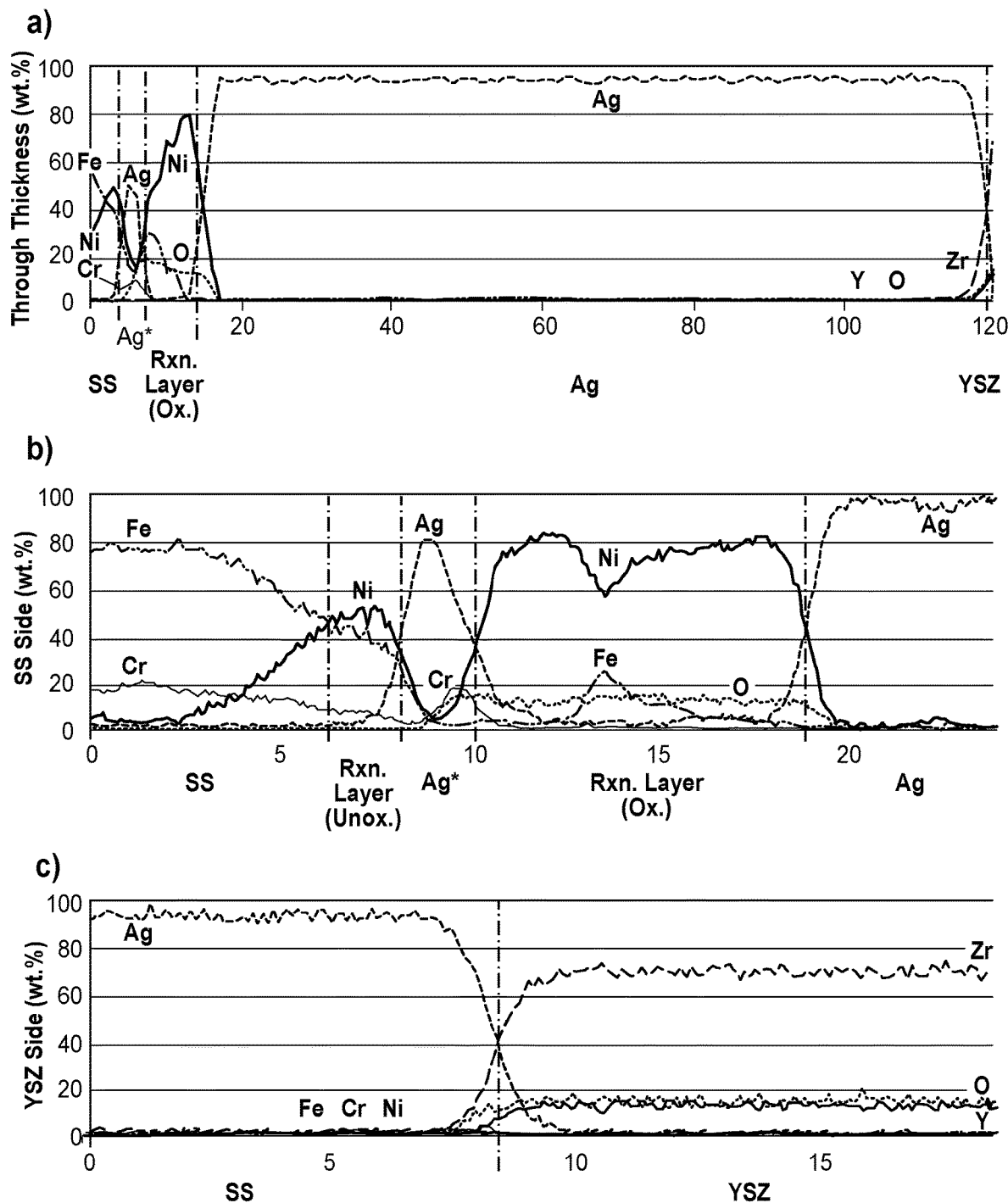
FIG. 7 shows EDS line scans of a 30 minute brazed sample across the 120 h 750° C. oxidized brazed joint center (panel A); across the 120 h 750° C. oxidized SS-braze interface (panel B); across the 120 h 750° C. oxidized YSZ-braze interface (panel C); across the 500 h 750° C. oxidized joint center (panel D); across the 500 h 750° C. oxidized SS-braze interface (panel E); and 500 h 750° C. oxidized YSZ-braze interface, at the locations indicated in FIG. 5, panels C-H, respectively.
Figure 7:
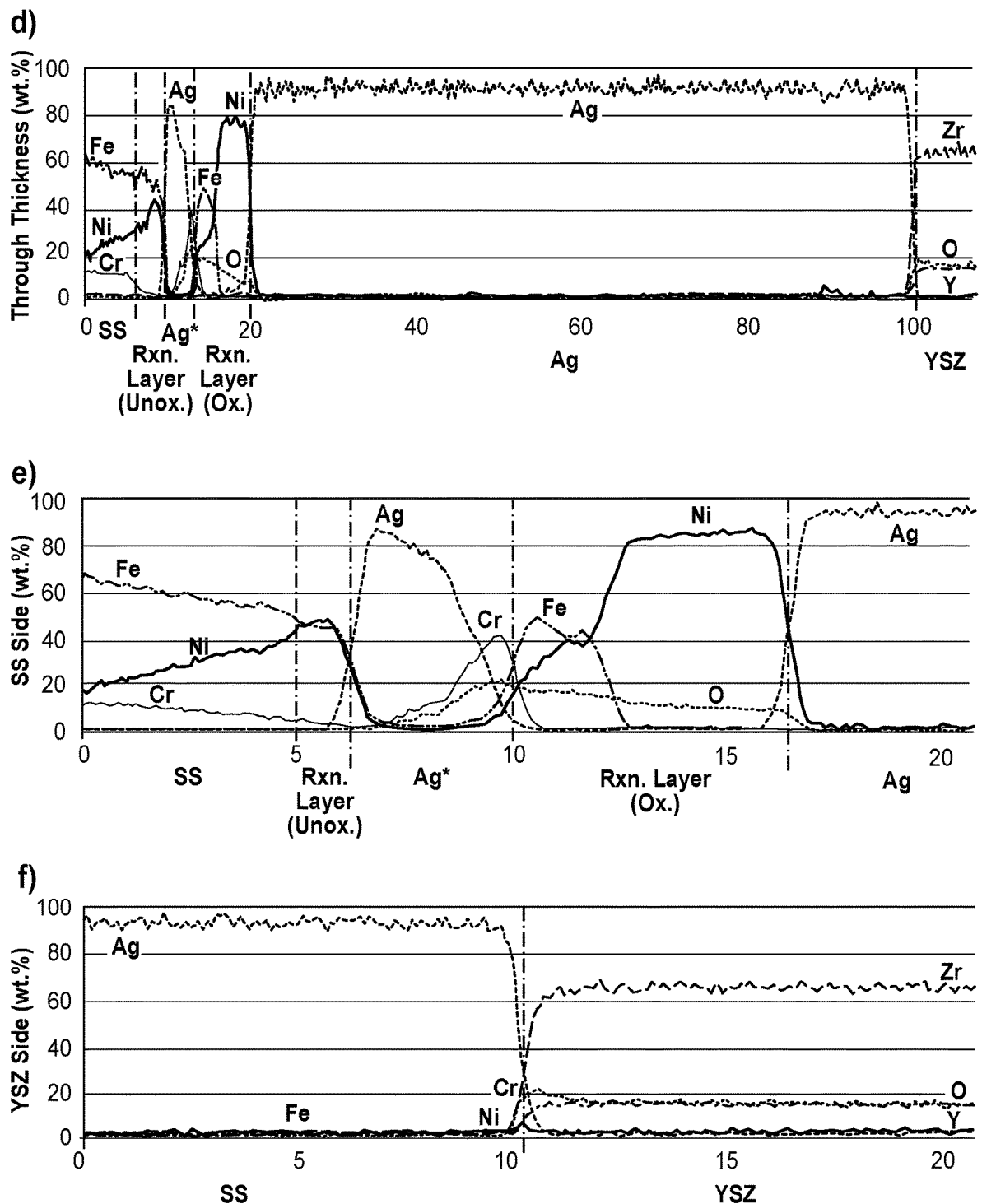

FIG. 7 panels A-F show EDS line scans taken on the 30 min brazed joint along the lines indicated in FIG. 6 panels C-H, respectively.

FIG. 7 panels A and D show that the center of the braze joint remained nominally pure silver after 120 and 500 h of 750° C. oxidation. FIG. 7 panels B and E clearly show the Ag* layer, the unoxidized reaction layer, and two different phases within the oxidized portion of the reaction layer. FIG. 7 also shows that a chromia-rich layer formed between the Ag* and oxidized reaction layer. Without intending to be bound by theory, given chromia's excellent surface passivation characteristics at 750° C. in other systems, this chromia layer likely helped protect the unoxidized portion of the reaction layer from the oxygen conducted through the silver in the center of the braze joint, provide a diffusion barrier that at least partially protected the SS from oxidation. FIG. 7 panel F also suggests that a very thin chromia ($Cr_2O_3$) layer may exist between the silver and the YSZ after brazing. This chromia layer may help prevent the Ag from dewetting in the molten state after the porous nickel layer leaves.

The 120 h oxidized sample EDS scan analysis of FIG. 7 panel C shows a "sharp" interface between the braze and YSZ. However, as shown in FIG. 7, panel E, longer oxidation times resulted in detectable amounts of nickel oxide and chromium oxide at the braze-YSZ interface. These phases likely correspond to the dark phase seen along the braze-YSZ interface in FIG. 6 panel H. Without intending to be bound by theory, in light of the poor wetting characteristics of Ag on YSZ, the low predicted work of adhesion for Ag on YSZ, and the higher word of adhesion predicted between Ag and Ni, NiO, or CrO on the surface of YSZ, it is likely that small amounts of residual nickel from the porous nickel layer and chromium from the SS may have oxidized at the braze-YSZ interface and also helped prevent Ag dewetting after dissolution of the porous nickel interlayer.

Braze Joint Strain-Stress Curves

FIG. 8 shows room temperature stress-strain curves for the SS|Ni—Ag|YSZ braze joint after 970° C. fabrication in Ar, 120 h of 750° C. oxidation and 500 h of 750° C. oxidation. In all cases the braze joint exhibited large amounts of deformation (>30% of shear strain) before failure, and when failure did occur it always occurred with the brittle fracture of the underlying YSZ|NiO-YSZ supports and not through the braze or braze interfaces (similar to the results obtained from FIG. 4). Despite the variations in the shape of the curves, likely due to lateral braze joint thickness variations (as shown in FIG. 3 panels A and B, and FIG. 6 panel A) caused by the experimental setup, both sets of samples showed good reproducibility. The decreasing failure strain with increasing oxidation shown in FIG. 8 is indicative of a loss of ductility or a reduction in the effective braze joint thickness with oxidation. However, the fact that much of the joint will likely remain unoxidized during SOFC operation and the large >30% failure strains suggested that these SS|Ni—Ag|YSZ braze joints will remain mechanically stronger and robust over SOFC lifetimes.

Therefore, Example 1 demonstrates the brazing method for joining substrates according to the disclosure.

REFERENCES

1. B. C. H. Steele and A. Heinzel, *Nature,* 414, 345 (2001).
2. E. D. Wachsman and K. T. Lee, *Science,* 334, 935 (2011).
3. J. D. Nicholas, *The Electrochemical Society Interface,* 22, 49 (2013).
4. T. Bause, J. Malzbender, M. Pausch, T. Beck and L. Singheiser, *Fuel Cells,* 13, 578 (2013).
5. J. W. Fergus, *Journal of Power Sources,* 147, 46 (2005).
6. J. A. Fernie, R. A. L. Drew and K. M. Knowles, *International Materials Reviews,* 54, 283 (2009).
7. G. F. Reisdorf and K. J. Haltiner Jr., SOFC Assembly Joint Spacing, U.S. Pat. No. 8,168,347 B2, (Oct. 14, 2005).
8. W. C. Hasz, Fuel Cell with a Brazed Interconnect and Method of Assembling the Same, U.S. Patent 20110269054 A1, (Jul. 14, 2011).
9. J. Y. Kim, J. S. Hardy and K. S. Weil, *Journal of the American Ceramic Society,* 88, 2521 (2005).
10. J. Y. Kim, J. S. Hardy and K. S. Weil, *Journal of Materials Research,* 20, 636 (2005).
11. R. Chatzimichail, G. Triantafyllou, F. Tietz and P. Nikolopoulos, *Journal of Materials Science,* 49, 300 (2014).
12. J. I. J. Choi, W. Mayr-Schmolzer, I. Valenti, P. Luches, F. Mittendorfer, J. Redinger, U. Diebold and M. Schmid, *Journal of Physical Chemistry C,* 120, 9920 (2016).
13. S. Hashimoto, Y. Fukuda, M. Kuhn, K. Sato, K. Yashiro and J. Mizusaki, *Solid State Ionics,* 181, 1713 (2010).

14. J. Y. Kim, J.-P. Choi and K. S. Weil, *International Journal of Hydrogen Energy*, 33, 3952 (2008).
15. J. Y. Kim, J. S. Hardy and S. Weil, *International Journal of Hydrogen Energy*, 32, 3655 (2007).
16. C. J. Smithells, W. F. Gale and T. C. Totemeier, *Smithells Metals Reference Book*, Elsevier Butterworth-Heinemann, Amsterdam; Boston (2004).
17. V. K. Nagesh and J. A. Pask, *Journal of Materials Science*, 18, 2665 (1983).
18. R. C. Hula, C. Edtmaier, M. Holzweber, H. Hutter and C. Eisenmenger-Sittner, *Applied Surface Science*, 256, 4697 (2010).
19. K. P. Trumble, *Acta Materialia*, 46, 2363 (1998).
20. H. Baker and H. Okamoto, ASM Handbook, Volume 03—Alloy Phase Diagrams, in, ASM International.
21. W. R. Tyson and W. A. Miller, *Surface Science*, 62, 267 (1977).
22. B. Kuhn, F. J. Wetzel, J. Malzbender, R. W. Steinbrech and L. Singheiser, *Journal of Power Sources*, 193, 199 (2009).
23. M. Singh, T. P. Shpargel and R. Asthana, *Journal of Materials Science*, 43, 23 (2008).
24. M. Singh, T. P. Shpargel and R. Asthana, *Materials Science and Engineering a-Structural Materials Properties Microstructure and Processing*, 485, 695 (2008).
25. S. Le, Z. Shen, X. Zhu, X. Zhou, Y. Yan, K. Sun, N. Zhang, Y. Yuan and Y. Mao, *Journal of Alloys and Compounds*, 496, 96 (2010).
26. K. Bobzin, N. Kopp and S. Wiesner, *Advanced Engineering Materials*, 16, 1456 (2014).
27. Zhou Q, Bieler TR, and Nicholas JD. Transient Porous Nickel Interlayers for Improved Silver-Based Solid Oxide Fuel Cell Brazes. *Acta Materialia*. 2018; 148: 156-162.

What is claimed is:

1. A brazed joint comprising:
   (a) a first substrate;
   (b) a bulk second metal layer adjacent to the first substrate, the bulk second metal layer comprising a first metal and the second metal, the first metal being at a lower concentration than the second metal in the bulk second metal layer;
   (c) a diffusion layer adjacent to the bulk second metal layer, the diffusion layer comprising the first metal and at least one component of a second substrate adjacent to the diffusion layer; and
   (d) a second substrate adjacent to the diffusion layer.

2. The brazed joint of claim 1, wherein:
   the bulk second metal layer has a first metal concentration of 20 wt. % or less; and
   the diffusion layer has a first metal concentration of at least 10 wt. % and greater than the first metal concentration of the bulk second metal layer.

3. The brazed joint of claim 1, wherein the bulk second metal layer has a second metal concentration ranging from 70 wt. % to 99 wt. %.

4. The brazed joint of claim 1, wherein the bulk second metal layer is substantially free from discrete first metal particles having a size greater than 1 μm.

5. The brazed joint of claim 1, wherein the diffusion layer is substantially free from first metal particles.

6. The brazed joint of claim 1, wherein the diffusion layer comprises the second metal at a concentration ranging from 1 wt. % to 30 wt. %.

7. The brazed joint of claim 1, wherein:
   the first substrate comprises a ceramic material, and
   the second substrate comprises a metal material.

8. The brazed joint of claim 7, wherein the component of the second substrate in the diffusion layer comprises a metallic component of the metal material at a concentration ranging from 5 wt. % to 80 wt. %.

9. A method of assembling a solid-oxide fuel cell, the method comprising:
   (a) providing the brazed joint of claim 1, wherein the first substrate comprises a ceramic material, and the second substrate comprises a metal material; and
   (b) incorporating the brazed joint into a solid-oxide fuel cell as a stack component thereof.

10. The brazed joint of claim 1, wherein the second metal has a lower melting point than that of the first metal.

11. The brazed joint of claim 1, wherein the melting point of the second metal is lower than the melting point of the first metal by at least 300° C.

12. The brazed joint of claim 1, wherein the melting point of the second metal is lower than the melting point of the first metal by 300° C. to 700° C.

13. The brazed joint of claim 1, wherein the melting point of the second metal is lower than the melting point of the first metal by 700° C. to 1000° C.

14. The brazed joint of claim 1, wherein:
   the first metal comprises at least one of nickel, aluminum, cobalt, iron, copper, and combinations thereof; and
   the second metal comprises at least one of silver, aluminum, tin, bismuth, nickel, copper, gold, cobalt, and combinations thereof.

15. The brazed joint of claim 1, wherein the second metal comprises silver.

16. The brazed joint of claim 1, wherein the first substrate comprises a ceramic material selected from the group consisting of aluminum oxide, zirconium oxide, cerium oxide, zinc oxide, silicon carbide, silicon nitride, tungsten carbide, and combinations thereof.

17. The brazed joint of claim 1, wherein the first substrate and the second substrate each comprise a metal material.

18. The brazed joint of claim 1, wherein the first substrate and the second substrate each comprise a different metal material.

19. The brazed joint of claim 1, wherein the first substrate and the second substrate each comprise at least one of a stainless steel alloy and a nickel-based high temperature alloy.

20. The brazed joint of claim 1, wherein the first substrate and the second substrate each comprise a different stainless steel alloy.

* * * * *